US010508544B2

(12) United States Patent
Lee

(10) Patent No.: US 10,508,544 B2
(45) Date of Patent: Dec. 17, 2019

(54) ROTARY JET, POWER GENERATION SYSTEMS AND MOTORS INCLUDING THE SAME, AND METHODS OF MAKING AND USING THE SAME

(71) Applicant: Brent Wei-Teh Lee, Saratoga, CA (US)

(72) Inventor: Brent Wei-Teh Lee, Saratoga, CA (US)

( * ) Notice: Subject to any disclaimer, the term of this patent is extended or adjusted under 35 U.S.C. 154(b) by 618 days.

(21) Appl. No.: 15/227,846

(22) Filed: Aug. 3, 2016

(65) Prior Publication Data

US 2017/0260860 A1 Sep. 14, 2017

Related U.S. Application Data

(60) Provisional application No. 62/389,963, filed on Mar. 14, 2016, provisional application No. 62/390,756, (Continued)

(51) Int. Cl.
*F01D 1/32* (2006.01)
*B63H 11/04* (2006.01)
(Continued)

(52) U.S. Cl.
CPC ............... *F01D 1/32* (2013.01); *B63H 11/08* (2013.01); *B63H 11/12* (2013.01); *F02C 3/165* (2013.01);
(Continued)

(58) Field of Classification Search
CPC . F01D 1/32; F03D 15/05; F02K 7/005; F03B 3/08; B63H 1/12; B63H 1/14; B63H 1/26; B63H 5/00; B63H 5/07
See application file for complete search history.

(56) References Cited

U.S. PATENT DOCUMENTS 2,356,746 A * 8/1944 Boushey ................. F02K 7/005
244/60
2,438,151 A * 3/1948 Davis ..................... F02K 7/005
244/74
(Continued)

FOREIGN PATENT DOCUMENTS

CN 101413439 A 4/2009
CN 203528814 U 4/2014
(Continued)

OTHER PUBLICATIONS

Extended European Search Report dated Aug. 3, 2017; European Patent Application No. EP17158934.4; 8 pgs.; European Patent Office, Munich, Germany.
(Continued)

*Primary Examiner* — Richard A Edgar
*Assistant Examiner* — Brian O Peters
(74) *Attorney, Agent, or Firm* — Andrew D. Fortney; Central California IP Group, P.C.

(57) ABSTRACT

A rotary device (e.g., a rotary jet), power generation system, and methods of manufacturing and using the same are disclosed. The rotary jet includes a central axle or shaft, an inlet configured to receive at least one fluid, and a plurality of radial arms in fluid communication with the inlet, configured to rotate around the central axle or shaft. Each radial arm has a nozzle at a distal end thereof and an arc between the inlet and the nozzle. The radial arms extend radially from the central axle or shaft at least in part, and are configured to rotate when the fluid enters the inlet and passes through the radial arms, or when a rotational force is applied to the central axle or shaft. Each nozzle may have an opening facing away from a direction of rotation of the radial arms or facing in a direction parallel with the central axle or shaft.

22 Claims, 18 Drawing Sheets

Related U.S. Application Data filed on Apr. 8, 2016, provisional application No. 62/391,840, filed on May 12, 2016.

(51) Int. Cl.

| | | |
|---|---|---|
| *F03B 3/08* | (2006.01) | |
| *F02K 7/00* | (2006.01) | |
| *F02C 3/16* | (2006.01) | |
| *B63H 11/08* | (2006.01) | |
| *B63H 11/12* | (2006.01) | |
| *F03D 1/06* | (2006.01) | |
| *F03D 15/00* | (2016.01) | |

(52) U.S. Cl.
CPC ............... *F02K 7/005* (2013.01); *F03B 3/08* (2013.01); *F03D 1/0625* (2013.01); *F03D 15/05* (2016.05); *Y02E 10/223* (2013.01); *Y02E 10/721* (2013.01); *Y02P 70/523* (2015.11); *Y02P 70/525* (2015.11); *Y02T 50/671* (2013.01)

(56) References Cited

U.S. PATENT DOCUMENTS

| | | | |
|---|---|---|---|
| 2,474,685 A * | 6/1949 | McCollum | B64C 11/00 416/21 |
| 2,599,209 A | 6/1952 | Tenney et al. | |
| 2,705,051 A * | 3/1955 | Hauser | B63H 1/20 416/20 R |
| 3,059,428 A | 10/1962 | Galonska | |
| 3,266,252 A | 8/1966 | Hughes | |
| 3,516,253 A | 6/1970 | Allport et al. | |
| 4,050,849 A | 9/1977 | Sheets | |
| 4,424,042 A | 1/1984 | Gongwer | |
| 4,741,154 A | 5/1988 | Eidelman | |
| 5,282,356 A | 2/1994 | Abell | |
| 5,408,824 A | 4/1995 | Schlote | |
| 5,636,509 A | 6/1997 | Abell | |
| 6,668,539 B2 | 12/2003 | Schlote | |
| 6,996,971 B2 | 2/2006 | Schlote | |
| 2003/0033808 A1 | 2/2003 | Schlote | |
| 2004/0025509 A1 | 2/2004 | Lawlor et al. | |
| 2005/0120719 A1 | 6/2005 | Olsen | |
| 2005/0241315 A1 | 11/2005 | Schlote | |
| 2006/0260291 A1 | 11/2006 | Vandervort et al. | |
| 2008/0178572 A1 | 7/2008 | Vanholstyn | |
| 2011/0073048 A1 | 3/2011 | Juan et al. | |
| 2014/0338358 A1 | 11/2014 | Lee | |

FOREIGN PATENT DOCUMENTS

| | | |
|---|---|---|
| DE | 4441730 A1 | 5/1996 |
| WO | 2014018416 A1 | 1/2014 |

OTHER PUBLICATIONS

Office Action with English Translation dated Oct. 19, 2018, Chinese Patent Application No. 201710144421.5; 7 pgs.; The State Intellectual Property Office of the P.R.C., People's Republic of China.

Andrew Schlote; "Rotary Heat Engine"; Bibliographic Data of CN101413439 (A); Apr. 22, 2009; https://worldwide.espacenet.com.

D.A. Schwer and K. Kailasanath; "Rotating Detonation—Wave Engines"; 2011; 6 pages; NRL Review.

Office Action with English translation dated Jul. 24, 2019 for Chinese Patent Application No. 201710144421.5; 9 pgs.; The State Intellectual Property Office of the People's Republic of China.

* cited by examiner

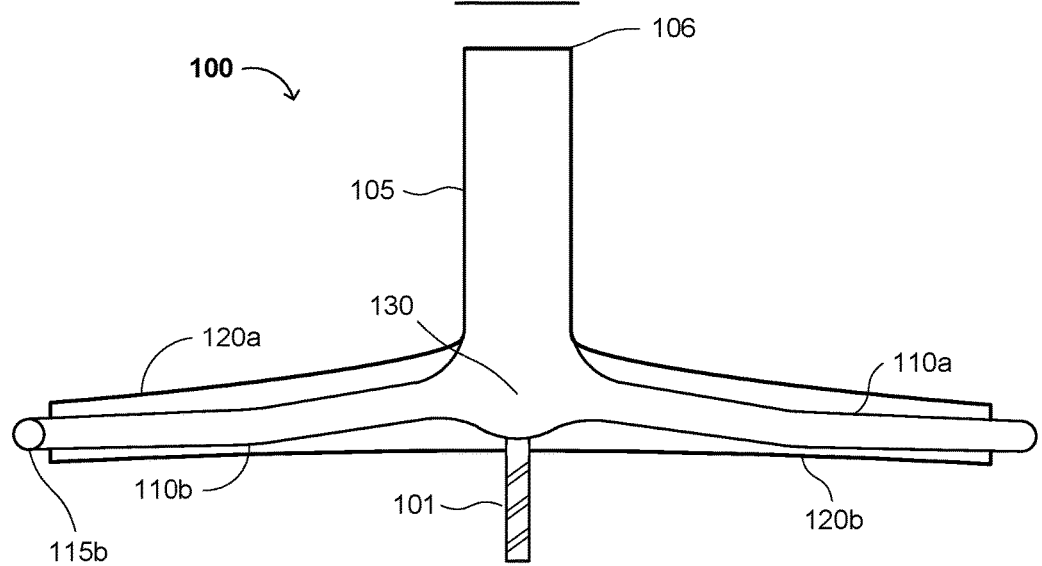
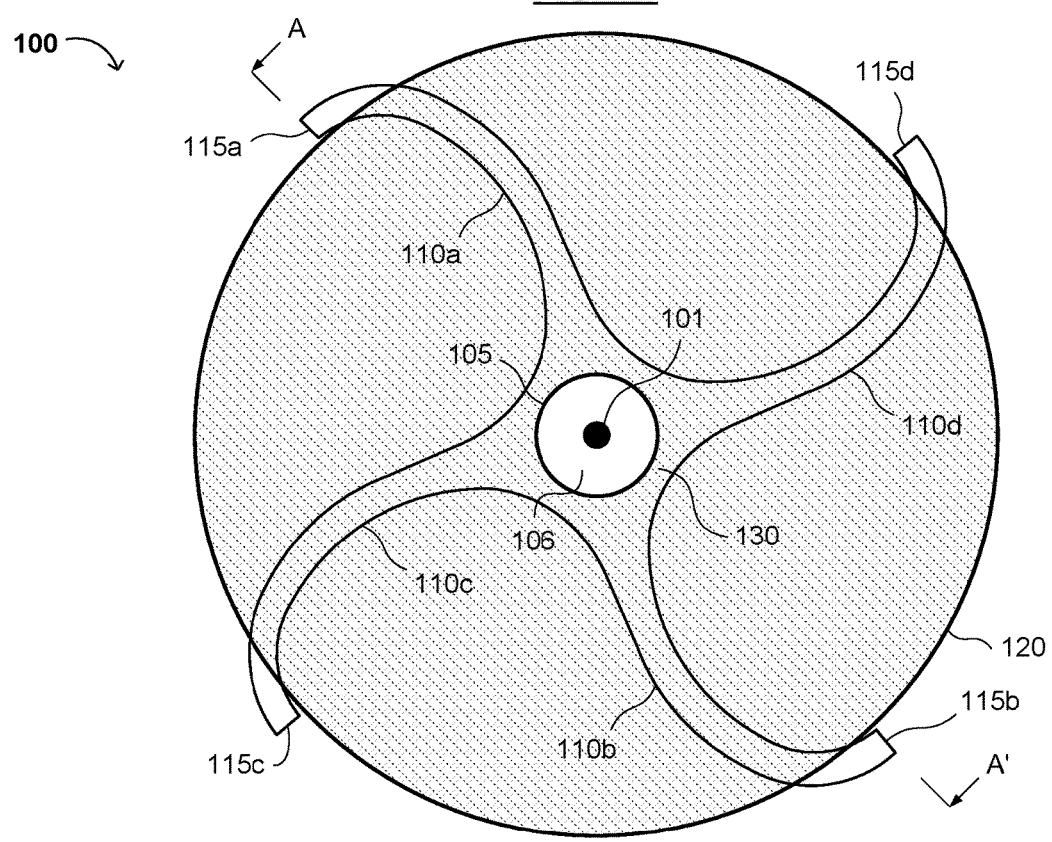

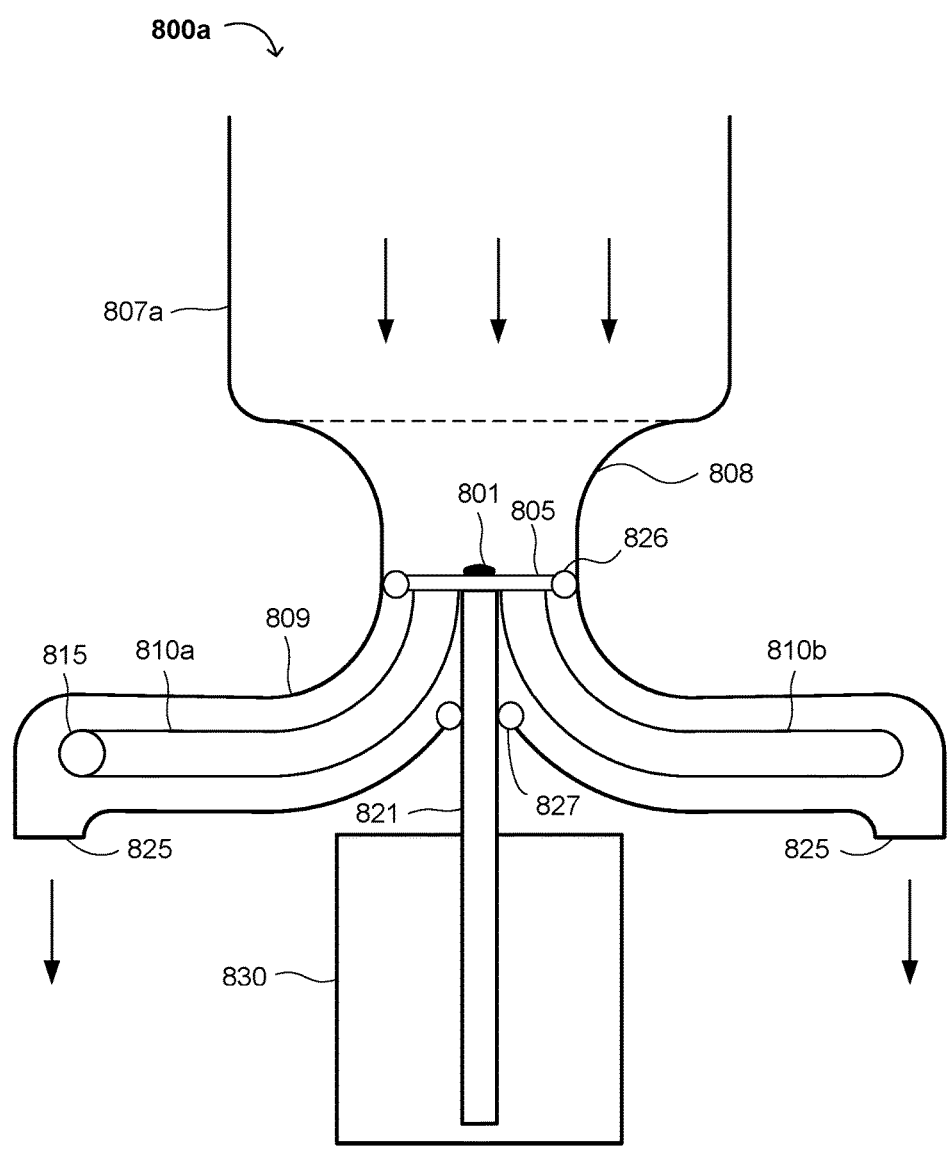

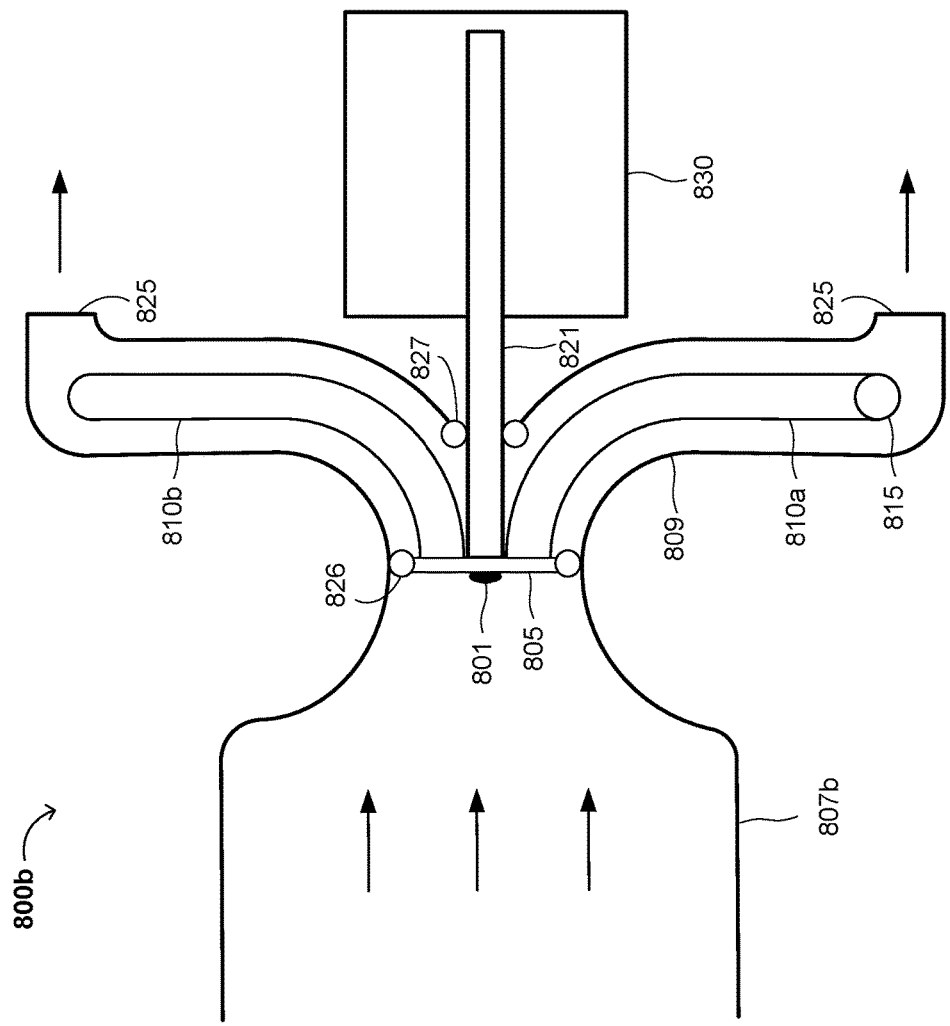

ROTARY JET, POWER GENERATION SYSTEMS AND MOTORS INCLUDING THE SAME, AND METHODS OF MAKING AND USING THE SAME

CROSS REFERENCE TO RELATED APPLICATION

This application claims the benefit of U.S. Provisional Patent Application Nos. 62/389,963, 62/390,756, and 62/391,840 filed on Mar. 14, 2016, Apr. 8, 2016, and May 12, 2016, respectively, which are incorporated herein by reference as if fully set forth herein.

FIELD OF THE INVENTION

The present invention generally relates to the field of rotary devices, power generation and power-driven devices (e.g., motors). More specifically, embodiments of the present invention pertain to a novel rotary fluid transporter (e.g., a "rotary jet"), power generation systems and motors including the same, and methods of manufacturing and using the same.

DISCUSSION OF THE BACKGROUND

Most conventional power generation involves engines and motors. However, these technologies generally require combustible material (e.g., fuel, oil and/or coal) and expensive equipment (e.g., in terms of purchase price and maintenance costs). In addition, such material and equipment may consume a lot of space, requiring use of a large amount of ground are or real estate and driving up costs. Furthermore, these technologies may cause air and noise pollution and global warming. As a result, there is a need for more efficient and more reliable technologies for propelling vehicles and producing energy and/or electricity.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to a novel rotary device (e.g., a rotary jet), power generation systems and motors including the same, and methods of manufacturing and using the same. The present rotary jet advantageously generates or uses a rotational driving force to make electricity (in some cases, without combustible materials) and to transport or move fluids such as air or water efficiently. The present rotary jet also advantageously utilizes a self-amplifying rotary motion or movement that may increase the net thrust of the device. As a result, the present rotary jet may be more efficient and may have less wear and tear than conventional power generating devices such as engines, and may have fewer and less expensive parts subject to such wear and tear.

In one aspect, the present invention relates to a rotary device that includes a central axle or shaft, an inlet configured to receive at least one fluid and a plurality of radial arms in fluid communication with the inlet, configured to rotate around the central axle or shaft. Each radial arm has a nozzle at a distal end thereof and an arc between the inlet and the nozzle. The radial arms extend radially from the central axle or shaft at least in part, and rotate when the fluid enters the inlet and passes through the radial arms and/or when a rotational force is applied to the central axle or shaft. Each nozzle has an opening facing away from the direction of rotation of the radial arms. In exemplary embodiments of the present invention, the fluid may flow through the nozzle at an angle perpendicular or substantially perpendicular to the central axle or shaft and/or to an angle of the fluid as the fluid enters the radial arms from the inlet. The fluid may comprise air, steam, water, combustion or detonation gases, chemical reaction gases, a coolant, or a refrigerant.

In various embodiments of the present invention, the rotary device (e.g., a rotary jet) comprises a truncated tuba bell-shaped structure. In exemplary embodiments, the rotary jet further includes at least one aerodynamic surface on the radial arms. The aerodynamic surface is configured to reduce air resistance of the radial arm(s). In exemplary embodiments, each of the radial arms comprises a curved tubular arm. The radial arms may be equally spaced from each other by 360°/n, where n equals the number of the radial arms.

In some embodiments, the inlet may include a plurality of openings. Each of the plurality of openings may be connected to a corresponding and/or unique rotating arm. Alternatively, the inlet may have a single opening, in fluid communication with all of the radial arms. In such alternative embodiments, the device may further comprise a manifold fluidly connecting the inlet to the radial arms (e.g., the entrances thereof). In some embodiments, the inlet may rotate around the central shaft or axle, along with the radial arms. In further embodiments, the central axle or shaft is surrounded by a void or opening. The void or opening may be between the central axle or shaft and the inlet or manifold (e.g., an inner surface thereof).

In some embodiments of the present invention, the device may include a mechanical work unit that may be configured to receive rotational energy or a rotational force from the central axle or shaft. In such embodiments, the mechanical work unit may include a generator or an engine. For example, in power generation systems, such as hydraulic, gas or wind energy generators that include the present rotary jet, the mechanical work unit includes an electrical power generator. Alternatively, the mechanical work unit may be configured to apply the rotational force to the central axle or shaft. Thus, in further embodiments, the device may include a motor configured to provide or generate the rotational force that is applied to the central axle or shaft.

In additional or alternative embodiments, the device may include a fluid transporter (e.g., configured to move the fluid from a location adjacent or proximate to the inlet to a location adjacent or proximate to the nozzles). Examples of fluid transporters comprising the device of the present invention may include a pump, an air compressor, a vacuum cleaner, a water pump, a turbocharger, an engine, or a waterjet propulsion vehicle. The fluid transporter can also provide a platform or basis for a motor or engine for vehicular transportation (e.g., ground transportation such as automobiles, buses, trucks, etc.; water transportation such as boats or ships; air transportation such as planes, drones, etc.).

Another aspect of the present invention relates to a method of converting energy, including receiving a flowing fluid in an inlet, passing the fluid from the inlet through a plurality of radial arms, and expelling the fluid through a nozzle at a distal end of each of the radial arms to rotate the radial arms. The rotating radial arms apply a rotational force to a central axle or shaft connected to at least one of the inlet and the radial arms, and the rotational force is converted into mechanical work or electrical energy. Each nozzle has an opening facing away from the direction of rotation of the radial arms. In exemplary embodiments, the fluid exits the nozzles in a direction opposite from the direction of the rotational thrust and/or rotational force, and/or at an angle perpendicular or substantially perpendicular to the central shaft or axle.

In various embodiments, the method may further include reacting, heating or combusting one or more substances to form at least part of the flowing fluid. The fluid may thus include air, steam, water, combustion or detonation gases, chemical reaction gases, a coolant, or a refrigerant.

A further aspect of the present invention relates to a method of transporting a fluid, including applying a rotational force to a central axle or shaft being operatively connected to a plurality of radial arms that radially extend at least in part from the central axle or shaft, drawing the fluid into an inlet in fluid communication with the plurality of arms, the plurality of arms being configured to receive the flowing fluid from the inlet when the rotational force is applied to the central axle or shaft, and expelling the fluid through a nozzle at a distal end of each arm. Each nozzle has an opening facing away from a direction of rotation of the radial arms. Such a method is useful as a platform or basis for a water pump, an air compressor, a vacuum cleaner, etc.

In exemplary embodiments of the method of transporting a fluid, the fluid may include air or water, and the method comprises moving a vehicle, in which a motor in or attached to the vehicle applies the rotational force to the central shaft or axle. The inlet may be (i) immersed in the water or (ii) facing a propulsion direction of the vehicle.

The present rotary jet may be adapted for power generation (e.g., hydraulic power, gas [combustion] power, or wind power), fluid transportation devices (e.g., a vacuum pump, vacuum cleaner, water pump, air compressor or water jet) or other mechanical drive applications (e.g., milling or in various types of vehicles such as automobiles, boats, ships, planes, drones, etc., using air or water jet propulsion). Thus, the novel rotary jet can be integrated into conventional power generation systems, fluid transportation devices, and mechanical drive applications without extensive design changes or excessive cost. Also, the present invention may provide a continuous energy supply without significant pollution or environmental impact.

The present rotary jet advantageously is relatively simple in comparison to conventional fluid transporters and energy converters. Having as few as one moving part allows the present invention to be relatively easy to maintain and simple to construct. The present rotary jet has an excellent balance of cost and function, and is based on a relatively simple design that performs relatively well and at a relatively low or minimal cost. The present rotary jet may be operated using a variety of widely and/or naturally available fluids (e.g., air, steam, water, and other gases and liquids). These and other advantages of the present invention will become readily apparent from the detailed description of various embodiments below.

BRIEF DESCRIPTION OF THE DRAWINGS

FIG. 1A is a cross-sectional view of an exemplary rotary device (e.g., a rotary jet) according to one or more embodiments of the present invention.

FIG. 1B is a top-down view of the exemplary rotary device of FIG. 1A.

FIGS. 8A-C are cross-sectional views of various energy converters having exemplary rotary jets therein, in which FIG. 8A is a cross-sectional view of a hydraulic power generator according to one or more embodiments of the present invention, FIG. 8B is a cross-sectional view of a gas-based power generator according to other embodiments of the present invention, and FIG. 8C is a cross-sectional view of a wind energy generator according to one or more further embodiments of the present invention.

DETAILED DESCRIPTION

Figure 2A:
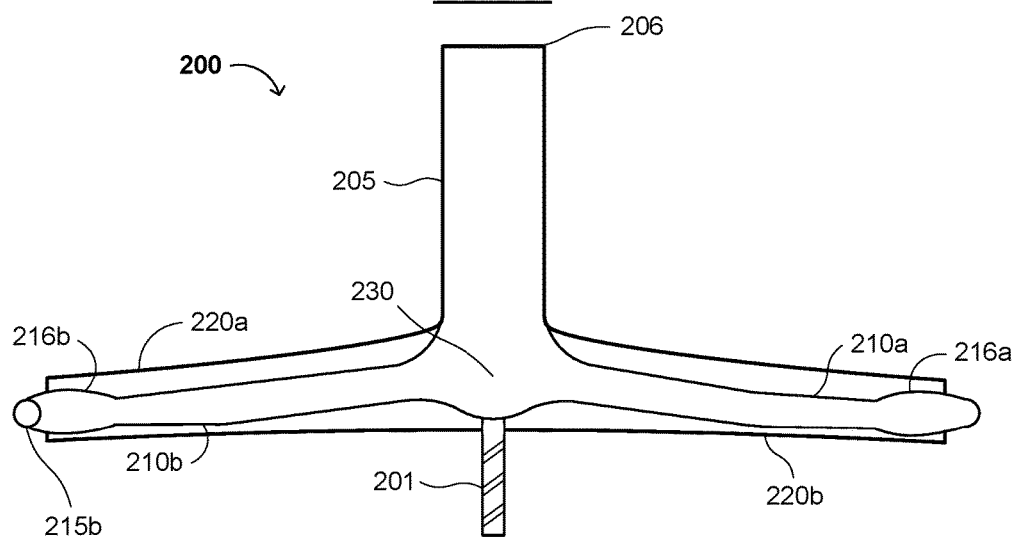
FIG. 2A is a cross-sectional view of another exemplary rotary device (e.g., rotary jet) according to one or more embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components and materials have not been described in detail so as not to unnecessarily obscure aspects of the present invention.

Thus, the technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise. Each characteristic is generally only an embodiment of the invention disclosed herein.

Embodiments of the present invention relate to a rotary device (e.g., a rotary jet) and methods of making and using the same. The present rotary jet may be advantageously used in a power generation system, a motor, an energy converter, and/or a fluid transporter. The present rotary jet is advantageously simpler and easier to manufacture and repair than conventional energy/power generation systems and motors, as it can have as few as one moving part (e.g., the combined axle/shaft and radial arms) and can be manufactured using inexpensive, mature and widely available materials and technology. The present rotary jet advantageously utilizes a "self-amplifying" rotary motion to generate a rotational driving force and/or to reduce rotational and other mechanical resistance, and increase the net thrust. As a result, the present rotary jet may be environmentally cleaner, more efficient and be subject to less wear and tear than conventional power generating devices, and may have fewer and less expensive parts subject to such wear and tear.

An Exemplary Rotary Jet

FIGS. 1A-1B show an exemplary rotary device (e.g., rotary jet) 100 according to embodiments of the present invention. The rotary jet 100 generally comprises a central axle or shaft 101, an inlet (e.g., a fluid inlet) 105 configured to receive at least one fluid (e.g., a flowable fluid), a plurality of radial arms (e.g., rotation arms) 110a-d extending radially from the inlet 105, and nozzles 115a-d at a distal end of each rotating arm 110a-d. The radial arms 110a-d have an arc between the inlet 105 and the nozzle 115a-d, and the radial arms 110a-d are configured to rotate when the fluid enters the inlet 105 and passes through the arms 110a-d, or when a rotational force is applied to the central axle or shaft 101. For example, each rotating arm 110a-b is curved or rounded and tubular or substantially tubular. In addition, each nozzle 115a-d has an opening that faces away from the direction of rotation of the radial arms 110a-d.

FIG. 1A is a cross-sectional view of the exemplary rotary jet 100. The central axle or shaft 101 is positioned along a central axis of the rotary jet 100 and thus may define a rotation axis for the radial arms 110a-d. In some embodiments, the central axle or shaft 101 extends through a lower or rear-facing surface of a manifold section 130 of the rotary jet 100. In other embodiments, the central axle or shaft 101 may extend through an opening 106 in the inlet 105. In further embodiments, the central axle or shaft 101 extends through both the opening 106 and the manifold 130.

The inlet 105 receives at least one fluid and supplies the fluid to the plurality of radial arms 110a-d through the manifold 130. In exemplary embodiments, the inlet 105, manifold 130 and arms 110a-d are unitary (e.g., one integrated piece), and the inlet 105 rotates radially around the central axle or shaft 105 along with the arms 110a-d. The inlet 105 may include a single conduit or path. The manifold 130 effectively splits the conduit or path in the inlet 105 into openings of the plurality of radial arms 110a-d. Alternatively, the inlet 105 may be fixed, and the manifold 130 and radial arms 110a-b are fixed to and rotate around the central axle or shaft 105. The central axle or shaft 101 may be joined, fastened and/or secured to the inlet 105, the manifold 130 and/or the radial arms 110a-d by conventional techniques. In addition, a cap (not shown) may cover the opening 106 to the inlet 105.

FIG. 1A shows radial arms 110a and 110b that extend from the manifold 130 and that spin or rotate around the central axle or shaft 101. A fluid (e.g., water or air) is funneled through the radial arms 110a-b by the manifold 130. The radial arms 110a-b may be welded and/or connected by bolts, clamps or screws to the manifold 130, or formed integrally with the manifold 130. Dimensions of the inlet 105 and the radial arms 110a-b can be optimized for a certain rotation rate, and it is within the ability of one skilled in the art to determine such dimensions (e.g., for a particular application). Preferably, the rotary jet 100 has an even number of radial arms 110a-b (e.g., 2, 4, 6, 8, etc.). However, the number of radial arms 110a-b may be 3, 5, 9, or any other number by which 360 can be evenly divided to give an integer or a regular fraction. Evenly-spaced, identical radial arms (e.g., 110a-110d, FIG. 1B) may increase the efficiency and balance of the rotary jet 100.

In exemplary embodiments, each rotating arm 110a-d includes a nozzle 115a-d (see, e.g., FIG. 1B). The nozzle 115a on rotating arm 110a is not shown in FIG. 1A because it faces away from the viewer (FIG. 1A is the cross-section of FIG. 1B along the A-A' line, viewing the cross-section in the direction of the arrows). The nozzles 115a-d are configured to expel the fluid and provide a rotation thrust and/or force to rotate the radial arms 110a-d around the central axle or shaft 101. In the present rotary jet, the centrifugal effect of the spinning radial arms 110a-b advantageously provides additional force or velocity to the fluid rushing out of the nozzles 115a-b, further increasing the rotational thrust and/or force on the radial arms 110a-b and/or the central axle or shaft 101, and reducing the force(s) opposing entry of the fluid into the inlet 105, positively reinforcing the flow of the fluid through the device 100 by a type of "self-amplification" mechanism.

In various embodiments, the device 100 may include aerodynamic surfaces 120a-b on or over the radial arms 110a-b. The aerodynamic surfaces 120a-b are configured to reduce the air resistance of the radial arms 110a-b during rotation. The aerodynamic surfaces 120a-b may include a disc or sheet having a circular or other shape optimized for aerodynamic function(s). The aerodynamic surface 120a may be the same as or different from the aerodynamic surface 120b. For example, the aerodynamic surfaces 120a-b may have a relatively sleek or angled shape that minimizes air resistance. The discs or sheets 120a-b may be attached or connected to the manifold 130 and/or arms 110a-d and may cover the spaces between the arms 110a-d (e.g., to form a disk), or be formed integrally with the manifold 130 and/or arms 110a-d. In some embodiments, the aerodynamic surfaces 120a-b cover the entire radial arms 110a-b, including the nozzles 115a-b. In other embodiments, the aerodynamic surfaces 120a-b may cover only part of the radial arms 110a-b. Dimensions of the aerodynamic surfaces 120a-b may vary, depending on the dimensions of the radial arms 110a-b and/or the desirability of minimizing air resistance.

In exemplary embodiments, fluid is received in an opening 106 of the inlet 105. As shown in FIG. 1B, the inlet 105 is a single conduit. The fluid passes through the radial arms 110a-d and rotates the radial arms 110a-d around the central axle or shaft 101, and is expelled out the nozzles 115a-d as thrust. The curved shape of the radial arms 110a-d (e.g., from the manifold 130 to nozzle 115) reduces the counter-force or back-pressure of the radial arms 110a-d onto the fluid entering the radial arms 110a-d.

Generally, the nozzles 115a-d can have a variety of shapes, including, but not limited to, circular, oval, curved, constricted, flared, combinations thereof, etc. Each of the nozzles 115a-d may be permanently or detachably connected to a corresponding rotating arm 110a-d or formed integrally with the rotating arm 110a-d. Nozzles 115a-d may be attached to the rotating arm 110a-d by various methods, including, but not limited to, welding, shrink fitting, gluing, screwing/threading, and/or compression fitting.

Each nozzle 115a-d is configured to expel the fluid from the corresponding arm 110a-d and provide a rotation thrust and/or force to rotate the radial arms 110a-d around the central axle or shaft 101. For example, the smaller the nozzle 115a-d, the greater the force exerted on or by the fluid expelled out of the nozzle. The nozzles 115a-d may have an angle of from about 45° to about 120° relative to a line at which the corresponding rotating arm 110a-d extends from the inlet 105 and/or manifold 130 to provide the rotational thrust and/or force. The nozzles 115a-d at the distal end of each rotating arm 110a-d has an opening facing away from the direction of rotation of the radial arms 110a-d. In various embodiments, the opening or outlet of the nozzles 115a-d face or point in a direction perpendicular to an imaginary straight line between the central axle or shaft 101 and the opening of the nozzle 115a-d, thus providing the rotational thrust and/or force.

The centrifugal force from the rotational movement of the radial arms 110a-d accelerates the fluid down the arms 110a-d, which accelerates the expulsion of the fluid from the nozzles 115a-d. The fluid leaving the nozzles 115a-d functions as a propellant, which in turn causes and/or speeds up the rotational movement of the arms 110a-d around the central axle or shaft 101, increasing the amount of fluid being transported and/or energy being converted and positively reinforcing the rotational speed of the radial arms 110a-d.

When the direction of each nozzle 115a-d is perpendicular or substantially perpendicular to the corresponding rotating arm (e.g., an angle of 60-120°, and in one example, about 90°), the force acting on the rotating arm 110a-d and the rotation speed are maximized according to Newtonian mechanics, as discussed in more detail below. The centrifugal force from the rotational movement accelerates the fluid down the arms 110a-d, which accelerates the expulsion of fluid, which acts as a propellant. The centrifugal force on the fluid/propellant increases as the rotation speed increases, which in turn increases the rotational force/thrust and the amount of fluid being transported and/or energy being converted. As the rotational thrust and/or force increases, the rotation speed of the radial arms 110a-d also increases. This is a self-amplifying, controllable chain reaction (or positive reinforcement) that enables the thrust to reach supersonic speeds and many times beyond, without the burden of excess fuel consumption and/or expensive mechanical parts. As a result, the fluid exiting the nozzles 115a-b has considerable dynamic energy. However, a limit to the chain reaction and/or positive reinforcement may be reached when the fluid in the inlet 105 exerts a positive back-force on the fluid proximate to the inlet 105, but not yet in the device 100, although even then, the chain reaction or positive reinforcement functions to reduce the forces that oppose rotation of the radial arms 110a-d.

Key principles and/or forces that may be involved in determining the energy transferred by the present rotary jet include (1) the angular kinetic energy, (2) the moment of inertia, (3) torque, (4) Bernoulli's principle, and (5) centrifugal force. Key forces that adversely affect energy transfer using the present rotary jet may include the aerodynamic drag force, friction, and centripetal force. In a rotation environment, a centrifugal field is self-created with the center of rotation having the highest potential. Particles in the rotation environment will move upon application of centrifugal force and gain kinetic energy under its influence. As a comparison, objects on the planet Earth are in a gravitational field, an object released from a high point will gain kinetic energy and accelerate down to the face of earth. When the particles exit out of the rotation system and the centrifugal field, the particle reaches its highest speed, which is contrary to the conventional water turbine, where exhaust water has very little kinetic energy left. In the present invention, the nozzles may point in a direction perpendicular to an imaginary line to the center of rotation. The rotational speed may increase based on Newton's laws of motion. The next particles entering the inlet may be influenced by a stronger centrifugal field as the rotational speed increases, and gain a higher speed than the earlier particles. This is considered to be a self-amplifying effect and chain reaction. Negative forces increase as the rotation speed increases, until a balance point and speed are reached.

FIG. 2A is a cross-sectional view of another exemplary rotary jet according to one or more embodiments of the present invention. Similar to the rotary jet 100 of FIGS. 1A-B, the rotary jet 200 includes a central axle or shaft 201, an inlet or conduit 205 configured to receive at least one fluid, a plurality of radial arms 210a-b extending radially from the inlet or conduit 205, and nozzles 215 at a distal end of each rotating arm 210a-b. However, each of the radial arms 210a-b of FIG. 2A have a respective larger or bulging region 216a-b at a distal end (e.g., adjacent to the nozzles). The bulging region 216a-b provides more mass at the distal end of the radial arms 210a-b, which may increase the centrifugal force exerted on the fluid expelled from the nozzles.

In the rotary jet 200, the radial arms 210a-b have a first end joined to the inlet or conduit 305. The first end of the radial arms 210a-b have a relatively large width or thickness. The radial arms 210a-b may extend from the manifold at an angle of from about 0° to about 30° (in the plane of rotation) and an angle of from about 60° to about 90° (in a plane defined at least in part by the central axle or shaft 201). These angles can also apply to the rotary jet 100 of FIGS. 1A-B. A second or distal end of the radial arms 210a-b opposite from the first end includes the relatively wide or bulging region 216a-b and terminates in the nozzle 215a-b.

Figure 2B:
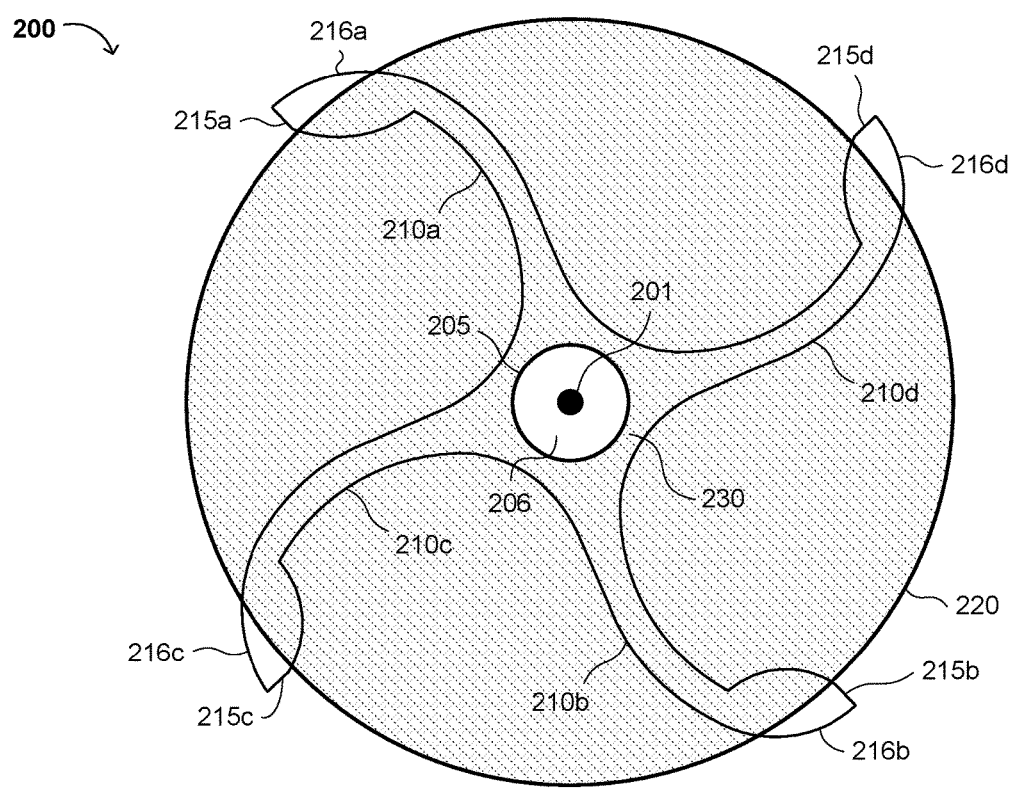
FIG. 2B is a top-down view of the exemplary rotary device of FIG. 2A.

FIG. 2B is a plan view of the exemplary rotary jet of FIG. 2A. The bulging regions 216a-d of the radial arms 210a-d having relatively greater diameter than the end of the radial arms 210a-d joined to the manifold 230. The bulging regions 216a-d may have a spheroid or prolate spheroid shape, as shown in FIG. 2B. The shape of the bulging region may be oval or circular. Alternatively, the bulging regions 216a-d may include various other three-dimensional shapes, such as a cube, a rectangular prism, rectangular cuboid, etc., but is not limited thereto. Each radial arm 210a-d has a nozzle 215a-d at the distal end thereof. The rotary jet 200 may optimize fluid dynamics at the distal ends of the radial arms 210a-d and minimize resistance of the flow of the fluid through the radial arms 210a-d.

In some embodiments, the present rotary jet may include a four-stage reaction process. The first stage may begin with fluid intake in a first end (e.g., curve) of the radial arms 210a-d, in which energy from the fluid pressure in the inlet is converted to a centrifugal force in the rotary jet. In some embodiments, the second stage may include the fluid traveling through the rotary arms 210a-d and accelerating as a result of the centrifugal force. The fluid may reach a relatively high speed in this stage. In some embodiments, the second stage may overlap with the first stage. The third stage may include changing a direction of the fluid flow (e.g., between the first end and the distal end of the radial arms 210a-d), so that the fluid may exit from the nozzles in a particular direction. In some embodiments, the fluid flow may change direction by 60-90°, in either or both of the plane of rotation and/or a plane including the entire central axle or shaft 201. The third stage may include storing some of the fluid in a reservoir. In various embodiments, the third stage may overlap with the second stage. The fourth stage may include expelling the fluid from the nozzles 215a-d at the distal end of the rotary arms 210a-d.

Figure 3A:
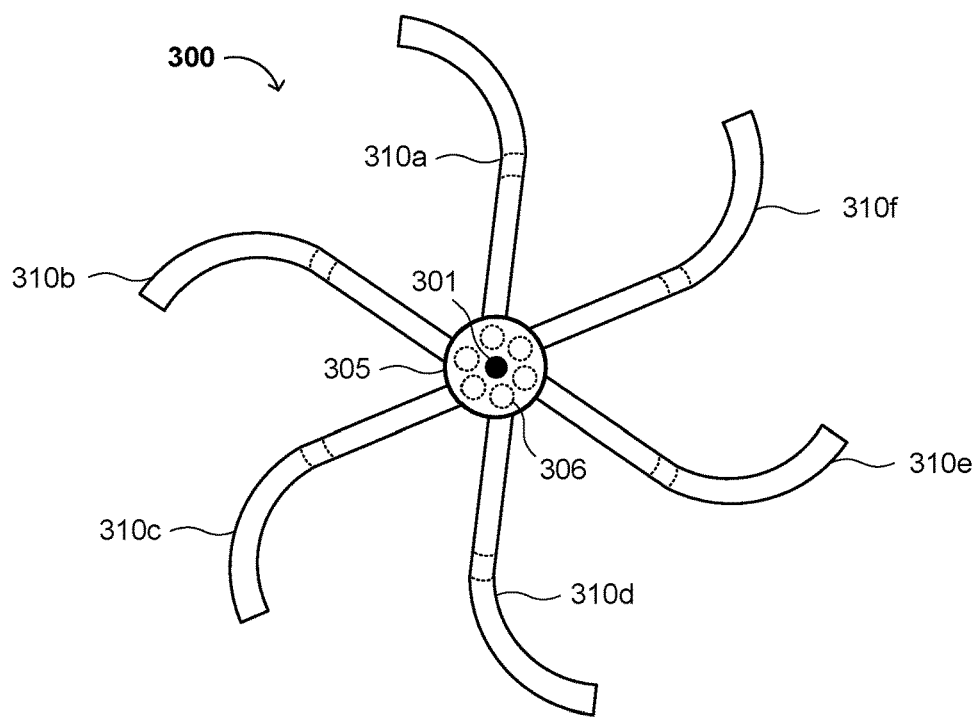
FIG. 3A is a front view of a prototype of a rotary jet according to one or more embodiments of the present invention.
Figure 3B:
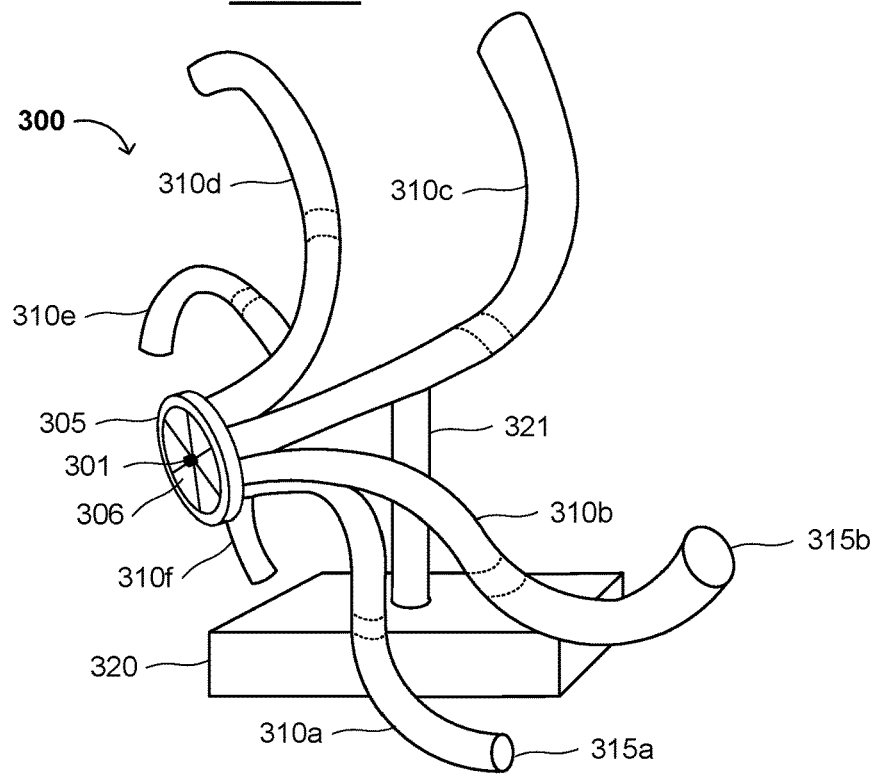
FIG. 3B is a perspective view of the prototype of the rotary jet of FIG. 3A.

FIGS. 3A-B are drawings depicting a prototype of an exemplary rotary jet 300. Similar to the rotary jets 100 and 200 of FIGS. 1A-B and 2A-B, the rotary jet 300 includes a central axle or shaft 301, an inlet 305 configured to receive at least one fluid, a plurality of radial arms 310a-f extending radially from the inlet 305, and nozzles 315a-f at a distal end of each rotating arm 310a-f. However, the aerodynamic surfaces are absent.

FIG. 3A is a front view of the exemplary rotary jet 300 having six radial arms 310a-f. The inlet 305 comprises a plate or disc that includes a plurality of openings 306 (shown as wedges in FIG. 3B for convenience). In the prototype device 300, the number of openings 306 is equal to the number of radial arms 310a-f, but the invention is not limited thereto. Each opening 306 corresponds to a unique rotating arm 310a-f. Each opening 306 may be circular, but it may also have a different shape, such as triangular or oval. Other shapes that the openings 306 may include a trapezoid or other quadrilateral or polygonal shape, but the shape of the openings 306 are not limited thereto.

In exemplary embodiments, the radial arms 310a-f have one or more arcs between the inlet 305 and the nozzle 315a-f. For example, each radial arm may comprise two 90° bent pipes or tubes, a first one of which is joined to a corresponding opening 306 and in which the 90° bend extends radially or substantially radially away from the central axle or shaft 301 and the inlet 305, and a second one of which is joined to the first pipe or tube (indicated by the dashed lines) and which is coplanar or substantially coplanar with the other second pipes or tubes. The plane in which the second 90° bent pipes or tubes are positioned is orthogonal to the central axle or shaft 301.

In various embodiments, the radial arms 310a-f are configured to rotate when the fluid passes to the radial arms 310a-f from the inlet 305. The rotary jet 300 of FIG. 3A may optimize fluid dynamics and minimize resistance of the flow of the fluid. For example, the fluidic path may be optimized by maintaining the radial arms 310a-f at a temperature consistent with the fluid. The temperature of the radial arms 310a-f may be maintained by thermally insulating the radial arms 310a-f, or heating the radial arms 310a-f when covered by an aerodynamic surface (see, e.g., FIG. 1A).

FIG. 3B is a perspective view of the exemplary rotary jet 300 of FIG. 3A. As shown in FIG. 3B, the rotary jet 300 is connected to a stand comprising a support post 321 and a base 320. The support post 321 is connected to the central axle or shaft 301, and has a height sufficient for the rotary jet 300 to rotate about the central axle or shaft 301. The central axle or shaft 301 and the connection to the support post 321 are not shown in FIG. 3B because the axle or shaft 301 and the connection are behind the radial arm 310c. In one embodiment, the central axle or shaft 301 is connected to the support post 321 by a rotary connector, enabling the rotary jet 300 to rotate circumferentially around the support post 321 and face in any direction (e.g., north [N], south [S], east [E], west [W], NE, SE, NW, SW, NNE, ENE, ESE, SSE, SSW, WSW, WNW, NNW, etc.). The base may have any dimensions, any mass or weight, and any shape capable of stabilizing rotation of the rotary arms and optionally the rotary jet 300 on the support post 321.

In the prototype shown in FIGS. 3A-B, the central axle or shaft 301 is fixed, and does not rotate. As a result, there may be a bearing (not shown) or lubricant between the inlet 305 and the central axle or shaft 301. The prototype rotary jet 300 can be used as a fluid (e.g., air) transporter, but more generally, it demonstrates proof of functionality for the present invention.

Figure 4A:
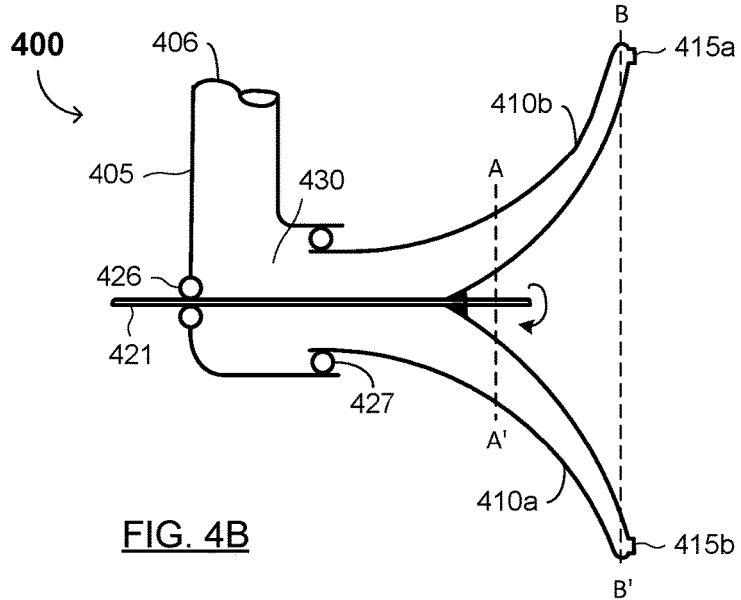
FIGS. 4A-B are cross-sectional views of yet another exemplary rotary jet according to one or more embodiments of the present invention.

FIG. 4A is a cross-sectional view of another exemplary rotary jet according to one or more embodiments of the present invention. Similar to the rotary jets 100 and 200 of FIGS. 1A-B and 2-B, the rotary jet 400 includes a central axle or shaft 401, an inlet or conduit 405 configured to receive at least one fluid, a plurality of radial arms 410a-b extending radially from the inlet or conduit 405, and nozzles 415 at a distal end of each rotating arm 410a-b. However, the rotary jet of FIG. 4A receives the fluid at an angle relative to the central axle or shaft 401.

Figure 4B:
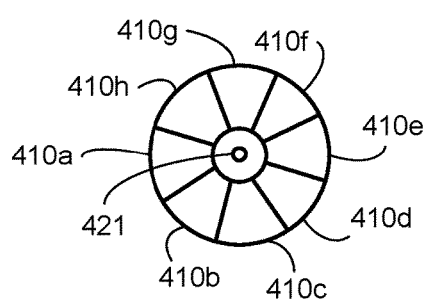

The main view of the exemplary rotary jet 400 in FIG. 4A shows two radial arms 410a-b. However, a cross-section of the rotary jet 400 along the line A-A' (FIG. 4B) shows eight sectional arms 410a-h (shown as wedges) surrounding the central axle or shaft 421, but the invention is not limited thereto. The inlet or conduit 405 may be cylinder-shaped or a tube-like structure having an angle or bend (e.g., of 90°) at an interface with the manifold 430. The inlet or conduit 405 may include an opening 406, the opening 406 being angled (e.g., perpendicular) relative to the central axle or shaft 421. Bearings 426 connect the inlet or conduit 405 to the central axle or shaft 421 to allow rotation of the central axle or shaft 421 without rotation of the inlet 405 and manifold 430. Bearings 427 connect the stationary manifold 430 to the radial arms 410a-b, which can rotate upon application of a rotational force to the central axle or shaft 421.

In the rotating jet 400, the radial arms 410a-h have one or more arcs between the manifold 430 and the nozzle 415. For example, the radial arms 410a-h may comprise at least a curved inner wall and a curved outer wall, each having as arc of from about 30° to about 90°, but with different radii. A first end of the radial arms 410a-h joined to inlet or conduit 405 may extend from the manifold at an angle of from about 0° to about 30° and have a relatively large width or thickness. A second, opposite end of the radial arms 410a-h may have a relatively narrow width or thickness. The radial arms 410a-h extend radially or substantially radially away from the central axle or shaft 421. As the radial arms 410a-b are rotated, a fluid passing through the radial arms 410a-b from the inlet or conduit 405 may amplify the force with which it is expelled from the openings 415a-h, due to the centrifugal force applied to the fluid.

In exemplary embodiments, the nozzles 415 point straight out (e.g., parallel with the central axle or shaft 421). Thus, when the rotary jet 400 is driven by a motor, centrifugal force pushes the fluid (e.g., water) out, and pulls additional fluid into the inlet or conduit 405. The rotary jet 400 of FIG. 4A may optimize fluid dynamics and minimize resistance of the flow of the fluid.

Figure 4C:
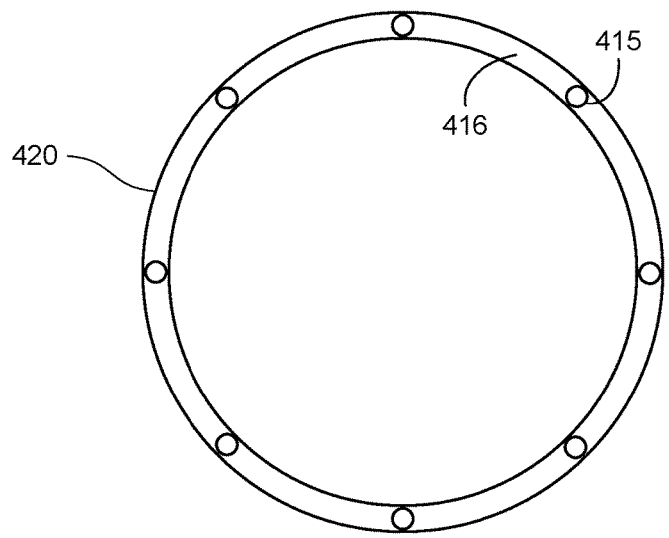
FIG. 4C is a bottom-up view of the exemplary rotary jet of FIGS. 4A-B.

FIG. 4C is a view of the exemplary rotary jet of FIG. 4A along the line B-B'. The rotary jet of FIGS. 4A-B has a conical and flared (e.g., horn or tuba bell-like) structure 420, and the distal end of the radial arms 410a-h has a ring-like or circular shape. Generally, a plurality of nozzles 415a-h are at the distal end of the structure 420. The structure 420 may comprise a material such as plastic, rubber, metal, etc. In addition, the structure 420 may comprise a double wall having an inner wall and an outer wall (e.g., having a hollow, ring-shaped cross-section), in which the distal end 416 may be sealed except where the nozzles 415a-h are located. Fluid travels through the double-walled structure 420 from the manifold 430 (FIG. 4A) to the nozzles 415a-h. In various embodiments, the double-walled structure 420 is subdivided into radial arms 410a-h. Furthermore, the nozzles 415 may be equally spaced or distributed around the ring of the structure 420, between the inner and outer walls of the structure 420, but the invention is not so limited. The structure 420 may optimize fluid dynamics at the distal ends of the radial arms 410a-h and minimize resistance of the flow of the fluid through the radial arms 410a-h.

Figure 5:
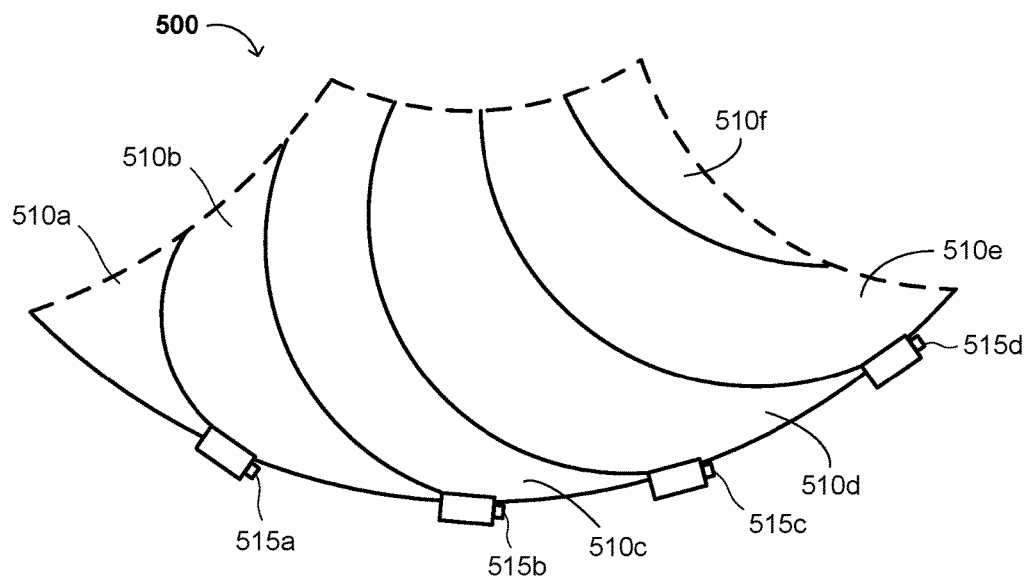
FIG. 5 is a cross-sectional, plan view of a section of an exemplary rotary jet according to one or more embodiments of the present invention.

FIG. 5 is a plan view of a section or portion an exemplary rotary jet 500 according to one or more embodiments of the present invention. The rotary jet 500 is substantially similar to the rotary jets in FIGS. 4A-B, except the radial arms 510a-f include a curve or arc along the truncated, flared, conical and/or horn/tuba bell-like structure (e.g., structure 420 of FIG. 4B), resulting in a fan-like or spiral pattern. In exemplary embodiments, nozzles 515b-e are at the distal end of the radial arms 510a-d along an outer circumference of the rotary jet 500. FIG. 5A shows parts or a whole of six radial arms 510a-f, but the rotary jet 500 actually includes 6 radial arms 510 and 6 corresponding nozzles 515. The rotary jet 500 is configured to rotate in response to a fluid being received at the inlet (not shown) and passing through it, and being expelled from the nozzles 515, as described herein.

Figure 6:
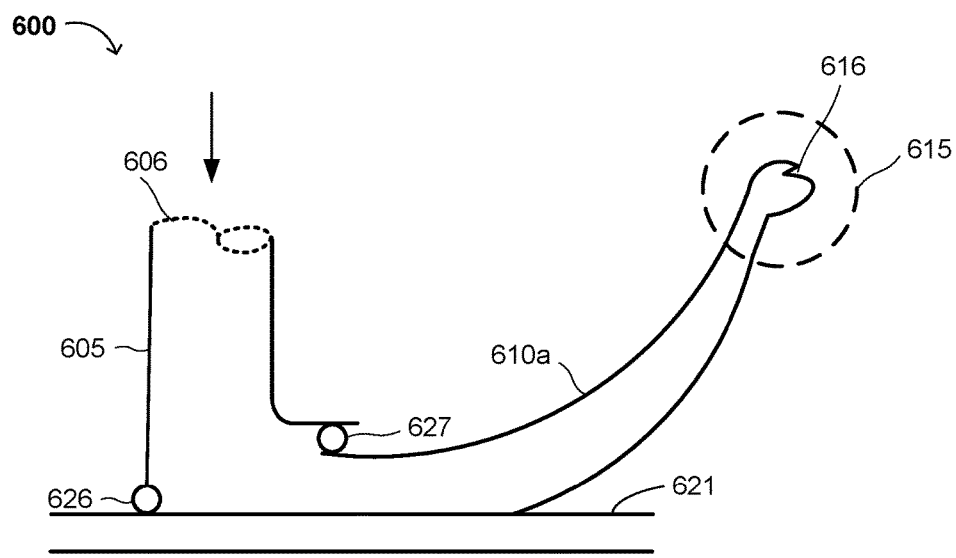
FIG. 6 is a cross-sectional view of yet another exemplary rotary jet according to one or more embodiments of the present invention.

FIG. 6 is a cross-sectional view of a portion of another exemplary rotary jet 600 according to one or more embodiments of the present invention. Similar to the rotary jets 100, 200 and 400 of FIGS. 1A-B, 2A-B and 4A, the rotary jet 600 includes a central axle or shaft 621, an inlet or conduit 605 configured to receive at least one fluid, radial arms 610 (only one radial arm 610a is shown for convenience) extending radially from the central axle or shaft 621, and nozzles 615 at a distal end of the rotating arms 610.

The inlet or conduit 605 may be a cylinder-shaped or tube-like structure in fluid communication with manifolds 630. The manifold 630 may be oriented at a 90° angle to the inlet 605. The inlet or conduit 605 may include a connector 606, the connector 606 being perpendicular to the central axle or shaft 621. Bearings 626 connect the inlet or conduit 605 to the central axle or shaft 621 to allow rotation of the central axle or shaft 621 while the inlet remains stationary. Bearings 627 connect the stationary manifold 630 to the radial arm(s) 610, which rotate upon application of a rotational force to the central axle or shaft 621.

In the rotary jet 600, the radial arms 610 may have one or more arcs between the manifold 630 and the nozzles 615, similar to the radial arms 410a-h of FIG. 4A. In various embodiments, as the radial arms 610 rotate, the force necessary to pass a fluid through the inlet or conduit 605, the manifold 630 and the radial arms 610 is less than the force necessary to do so in the absence of rotation of the radial arms 610.

In exemplary embodiments, the nozzles 615 have a slit or opening 616 that expels the fluid in a direction parallel or substantially parallel with the central axle or shaft 621. Generally, the slit 616 is at or in a distal end of the nozzle 615, away from the radial arm 610. The slit or opening 616 may be in or on an outer surface of the nozzle 615, furthest any from the central axle or shaft 621, as shown in FIG. 6. Alternatively, the slit or opening 616 may be on an inner surface of the nozzle 615. In one embodiment of the rotary jet 600 of FIG. 6, the fluid (e.g., air) is driven through the inlet 605 by a fan and is ejected through the slit 616 as the radial arms 610 rotate (e.g., by a motor applying a rotational force to the axle or shaft 621, to which the radial arms 610 are attached or connected). As a result, the fluid (e.g., air) circulates through an indoor or outdoor environment similarly to a bladeless fan.

Figure 7A:
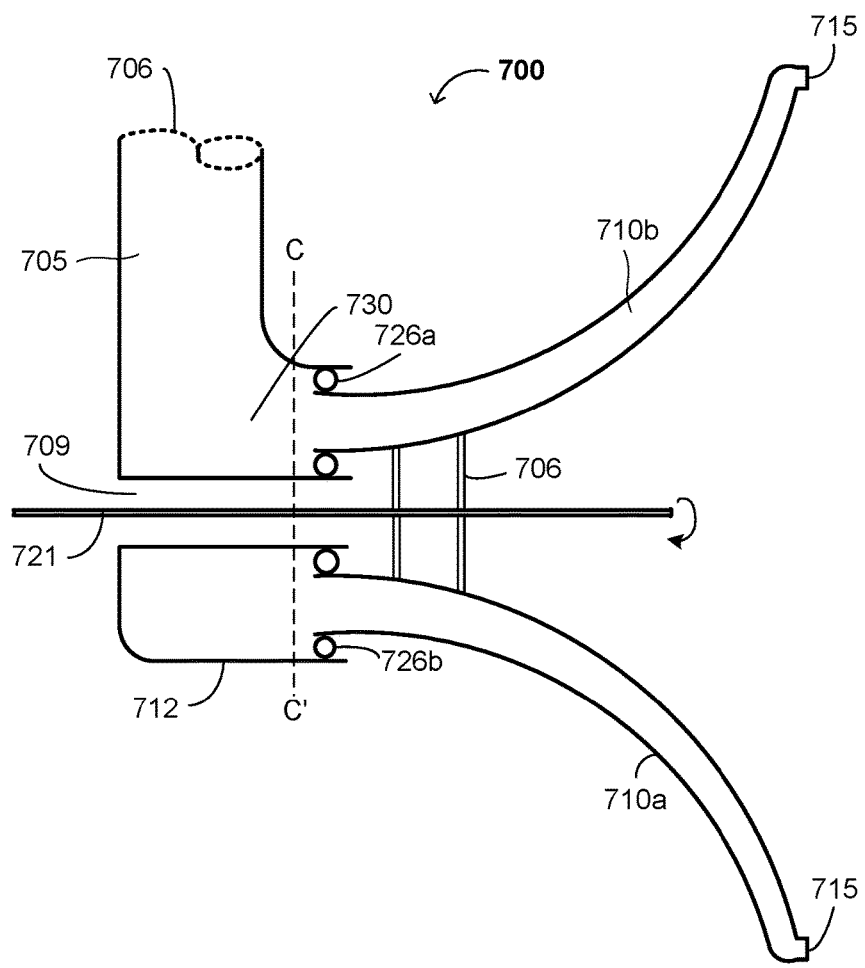
FIG. 7A is a cross-sectional view of yet another exemplary rotary jet according to one or more embodiments of the present invention.
Figure 7B:
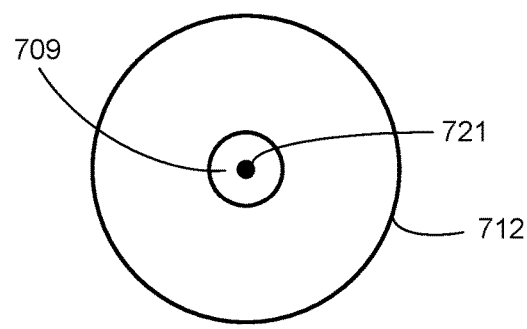
FIG. 7B is a top-down view of the exemplary rotary jet of FIG. 7A.

FIG. 7A is a cross-sectional view of yet another exemplary rotary jet 700 according to one or more embodiments of the present invention. Similar to the rotary jet 100, 200, 400, and 500 of FIGS. 1A-B, 2A-B, 4A and 5, the rotary jet 700 includes a central axle or shaft 721, an inlet or conduit 705 configured to receive at least one fluid, a plurality of radial arms 710a-b extending radially from the central axle or shaft 721, and a nozzle 715 at a distal end of each rotating arm 710a-b.

As shown in FIG. 7A, the exemplary rotary jet 700 may have two radial arms 710a-b, although the rotary jet 700 may have more radial arms (e.g., 4, 6, 8, 9, 10, 12, or any other integer number by which 360 may be divided to give another integer or regular fraction). The inlet or conduit 705 may be a cylinder or tube in fluid communication with a manifold 730 at a 90° angle with respect to the inlet or conduit 705. The inlet or conduit 705 may include a connector 706, the connector 706 being perpendicular to the central axle or shaft 721. The manifold 730 may include a void or opening 709 therein. Bearings 726a-b connect the manifold 730 to the radial arms 710a-b.

In exemplary embodiments, the connector 706 connects the radial arms 710a-b to each other around the central axle or shaft 721. The connector 706 may comprise or consist of a rigid, high-modulus material such as hard plastic (e.g., a thermosetting polymer such as an epoxy), a metal, a ceramic, etc., but is not limited thereto. The connector 706 may comprise a plurality of spokes or rods, or may be or comprise a disc or plate with a plurality of openings therein. The connector 706 is generally configured to allow air or other fluids to pass through the center of the rotary jet 700, along the central axle or shaft 721.

A cross-section of the rotary jet 700 along the C-C' line shows the central axle or shaft 721, surrounded by a void or opening 709 between the central axle or shaft 721 and the manifold 730. The void 709 allows air flow through the center of the rotary jet 700, which may increase the thrust or rotational force of the rotary jet 700. In addition, the void 709 allows ambient air from outside the rotary jet 700 to mix with the fluid ejected from the nozzles 715, which may reduce backdraft or a vortex-like airflow behind the device, and which may dilute contaminants or other components of the fluid (e.g., water) that may not be environmentally ideal at the concentrations in the fluid ejected from the nozzles 715.

In exemplary embodiments, the nozzles 715 may point straight out and parallel with the central axle or shaft 721, in which case the radial arms 710a-b rotate upon application of a rotational force on the central axle or shaft 721. Alternatively, the nozzles 715 may be perpendicular or substantially perpendicular to the central axle or shaft 721, in which case the radial arms 710a-b rotate upon the fluid passing through the inlet 705 and the radial arms 710a-b, in turn causing a rotational force to be applied to the central axle or shaft 721.

Figure 8C:
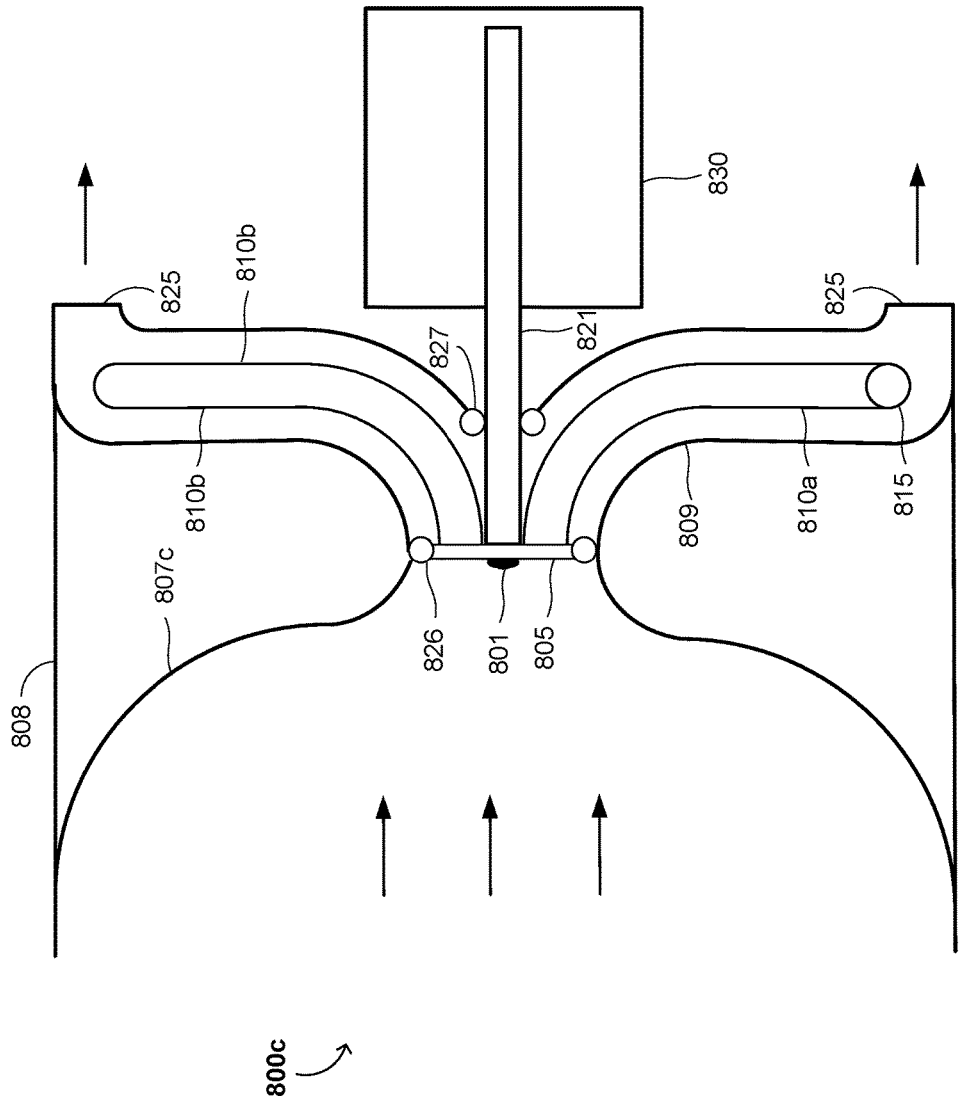

FIGS. 8A-C are cross-sectional views of various exemplary energy converters having exemplary rotary jets therein according to embodiments of the present invention. Similar to the rotary jets 100 of FIGS. 1A-B, 200 of FIGS. 2A-2B and 300 of FIGS. 3A-B, the rotary jets 800a-c of FIGS. 8A-C generally comprise a central axle or shaft 821 having a cap 801, an inlet 805 configured to receive at least one fluid, a plurality of radial arms 810a-b extending radially from the inlet 805, and nozzles 815 at a distal end of each rotating arm 810a-b (the nozzle on the rotating arm 810b is not shown because it faces away from the viewer). Although only two radial arms 810a-b are shown, the rotary jets in FIGS. 8A-C are not limited thereto (e.g., the rotary jets may have n radial arms, where n is an integer and 360/n is an integer or regular fraction).

FIG. 8A shows a cross-sectional view of a hydraulic power generator 800a having the present rotary jet according to one or more embodiments of the present invention therein. The rotary jet also includes a conduit 807a, a fitting or adapter 808, a housing 809, and a mechanical work unit 830.

The conduit 807a is generally configured to transport a fluid that is in the liquid phase at room temperature (e.g., 20-25°), such as water, and may have a cylindrical or tube-like shape. Alternatively, the conduit 807a may have a cross-section with an oval, square, rectangular, or other polygonal shape. In addition, the conduit 807a may comprise or consist of a plastic. For example, the plastic may comprise, but is not limited to, a polyurethane, a nylon, a vinyl polymer (e.g., PVC), polyethylene, polypropylene, or any combination thereof (e.g., with glass, metal, or another plastic). Alternatively, the conduit 807a may comprise a glass, a ceramic, porcelain, concrete, a rubber, fiberglass, a metal, and/or a combination thereof. The conduit 807a has dimensions and an angle or other position to facilitate the flow of liquid-phase fluid, and the material of the conduit may have a thickness and/or a tensile strength sufficient to withstand a relatively high internal pressure (e.g., at least one atm, such as 1.1-100 atm, or any value or range of values therein). Furthermore, the hydraulic generator 800a may include a valve (not shown) to control the flow of fluid (e.g., water) received at the inlet 805.

In exemplary embodiments, the fitting 808 may have a shape that facilitates the connection between the conduit 807a and the housing 809. The fitting 808 may include various types of materials. For example, the materials may include plastic, glass, a ceramic, concrete, a rubber, fiberglass, a metal, or a combination thereof. Furthermore, the fitting 808 may be conventionally joined to the conduit 807a and the housing 809, for example using a pressure and/or heat-shrunk fitting, an adhesive, a tape or other circumferential sealing material, or a combination thereof (e.g., with each other or with another sealing mechanism, such as a gasket or an O-ring).

In various embodiments, the housing 809 encloses or substantially encloses the inlet 805, bearings 826 and 827, an upper portion of the central axle or shaft 821, the radial arms 810a-b, and the nozzles 815. As shown in FIG. 8A, the housing 809 connects to the fitting 808, but in some alternative embodiments, the housing 809 may connect directly to the conduit 807a. The housing 809 may have an oval, circular, square, rectangular, or other regular or irregular polygonal shape, suitable to enclose the inlet 805, the radial arms 810a-b, and the nozzles 815. The dimensions of the housing 809 may vary depending on the dimensions of the inlet 805, the radial arms 810a-b, and the nozzles 815. Generally, the housing 809 includes an opening 825 having a shape configured to allow and/or optimize continued flow of the fluid (e.g., water) after it is expelled from the nozzles 815. In the example 800a of FIG. 8A, the opening 825 is circumferential (e.g., ring-shaped).

The mechanical work unit 830 in the hydraulic generator 800a includes an electricity generator configured to (i) receive the rotational force from the central axle or shaft 821, and (ii) generate electricity or electrical power. However, in other applications, the mechanical work unit 830 may include an engine, a pump, a turbine or other mechanical device that can be driven using a rotational force.

FIG. 8B is a cross-sectional view of a gas-based power generator 800b including an exemplary rotary jet according to another embodiment of the present invention. As shown in FIG. 8B, a conduit 807b is configured to receive a gas-phase fluid. In some embodiments, the fluid is in the gas phase at room or ambient temperature (e.g., 20-25° C.), but in other embodiments, the fluid is in the gas phase at an elevated temperature (e.g., greater than 100° C., such as 150-1500° C., or any temperature or range of temperatures therein). The conduit 807b is connected to the housing 809 in the same manner as or a similar manner to the conduit 807a and housing 809 in FIG. 8A. The conduit 807b and the housing 809 may be similar to the conduit 807a and the housing 809 of FIG. 8A. The conduit 807b and the housing 809 may be connected directly, as shown in FIG. 8B. In some alternative embodiments, the conduit 807b and the housing 809 may be connected via a fitting (not shown in FIG. 8B).

Conduit 807b may be made from the same material as the conduit 807a in FIG. 8A. However, the conduit 807b of FIG. 8B is more likely to be plastic or metal. Generally, the internal pressure in the conduit 807b is less than in the conduit 807a of FIG. 8A (e.g., in the range of 1-10 atm, or any pressure or range of pressures therein). As a result, the thickness of conduit 807b may be less than that of the conduit 807*a*. The fluid received by the conduit 807*b* may come from a combustion chamber, a chemical reactor (in which gaseous by-products are generated), a steam generator, a gas expander, etc.

The gas-phase fluid (which may be heated) is supplied to the radial arms 810*a-b* through the inlet 805. To control the amount of gas supplied to the rotary jet, a valve (not shown) may be included. The rotation or spinning of the radial arms 810*a-b* forces the gas along the radial arms 810*a-b* and expels the gas through the nozzles 815 and the opening 825 of the housing as exhaust. Opening 825 may consist of a single annular opening, in which case the housing 809 comprises two discs, shields or covers that may be joined in predetermined locations by one or more bridges, ties or other connections (not shown). Alternatively, the opening 825 may consist of multiple openings (e.g., to increase the mechanical strength of the housing 809).

Radial arms 810*a-b* and central shaft 801 are permanently or reversibly joined to the inlet 805, so that the central axle or shaft 801 rotates as the radial arms 810*a-b* rotate, thereby generating a rotational force using the central axle or shaft 801. The electrical generator 830 receives the rotational force from the central axle or shaft 821 and efficiently converts the received energy to electricity.

FIG. 8C is a cross-sectional view of a wind energy generator 800*c* including an exemplary rotary jet according to one or more embodiments of the present invention. As shown in FIG. 8C, a funnel or collector 807*c* is configured to receive and concentrate the incoming wind to create an air pressure at the neck of the funnel or collector 807*c*. The air passes from the funnel or collector 807*c* to the radial arms 810*a-b* through the inlet 805. The air from the funnel 807*c* is received by the inlet 805, then passed through the radial arms 810*a-b*, and expelled through the nozzles 815 and the opening 825 of the housing by the rotating or spinning of the radial arms 810*a-b*. The radial arms 810*a-b* rotate as described herein, causing a decrease in the air pressure immediately before the inlet 806, in turn decreasing the air pressure at the neck of the funnel or collector 807*c* and facilitating the collection of more air in the funnel or collector 807*c*.

The funnel or collector 807*c* may have a funnel, cone, or bowl-like shape. Alternatively, the funnel 807*c* may have a cross-section with a circular, oval or polygonal shape. In addition, the funnel 807*c* may comprise or consist of a plastic, a glass, a ceramic, a rubber, fiberglass, a metal, or a combination thereof, but plastic is advantageous due to its relatively low density (e.g., weight per unit volume) and low permeability (e.g., to the fluid passing through the rotary jet 800). A relatively high tensile strength material may be beneficial, but a frame or reinforcement 808 can provide mechanical strength and/or rigidity to the funnel or collector 807*c* when it is relatively flexible (e.g., a polyethylene or polypropylene sheet of 0.2-2 mm thickness). The frame or reinforcement 808 may consist or comprise a stiff or rigid plastic, fiberglass, metal, or a combination thereof, and may include a single member (e.g., a cylinder, a cone, or an n-sided polygonal tube or walled structure) or multiple members (e.g., a polygonal framework comprising a plurality of horizontal and/or angled beams supported by a plurality of cross-beams connecting adjacent one of the horizontal or angled beams). The funnel 807*c* has dimensions and a shape to facilitate the flow of air and its concentration at the inlet 805. In some embodiments, the wind energy generator 800*c* may also include a valve (not shown) to control the amount and/or flow of air supplied to the inlet 805.

In exemplary embodiments, the funnel 807*c* may connect directly to a housing 809. In some embodiments, a fitting (not shown) may be used to connect the funnel 807*c* and the housing 809, which encloses or substantially encloses the inlet 805, an upper portion of the central axle or shaft 821, the radial arms 810*a-b*, and the nozzles 815.

Air flows through radial arms 810*a-b* and exits opening 825 in substantially the same or similar manner as FIG. 8B, causing the radial arms 810*a-b* to rotate and generate rotational force. The rotational force is transferred to the mechanical work unit 830 using the central axle or shaft 821 in substantially the same or similar manner as FIG. 8B. As shown in FIG. 8C, the mechanical work unit 830 may include an electrical generator configured to (i) receive the rotational force from the central axle or shaft 821 and (ii) convert the received energy to electricity.

Figure 9:
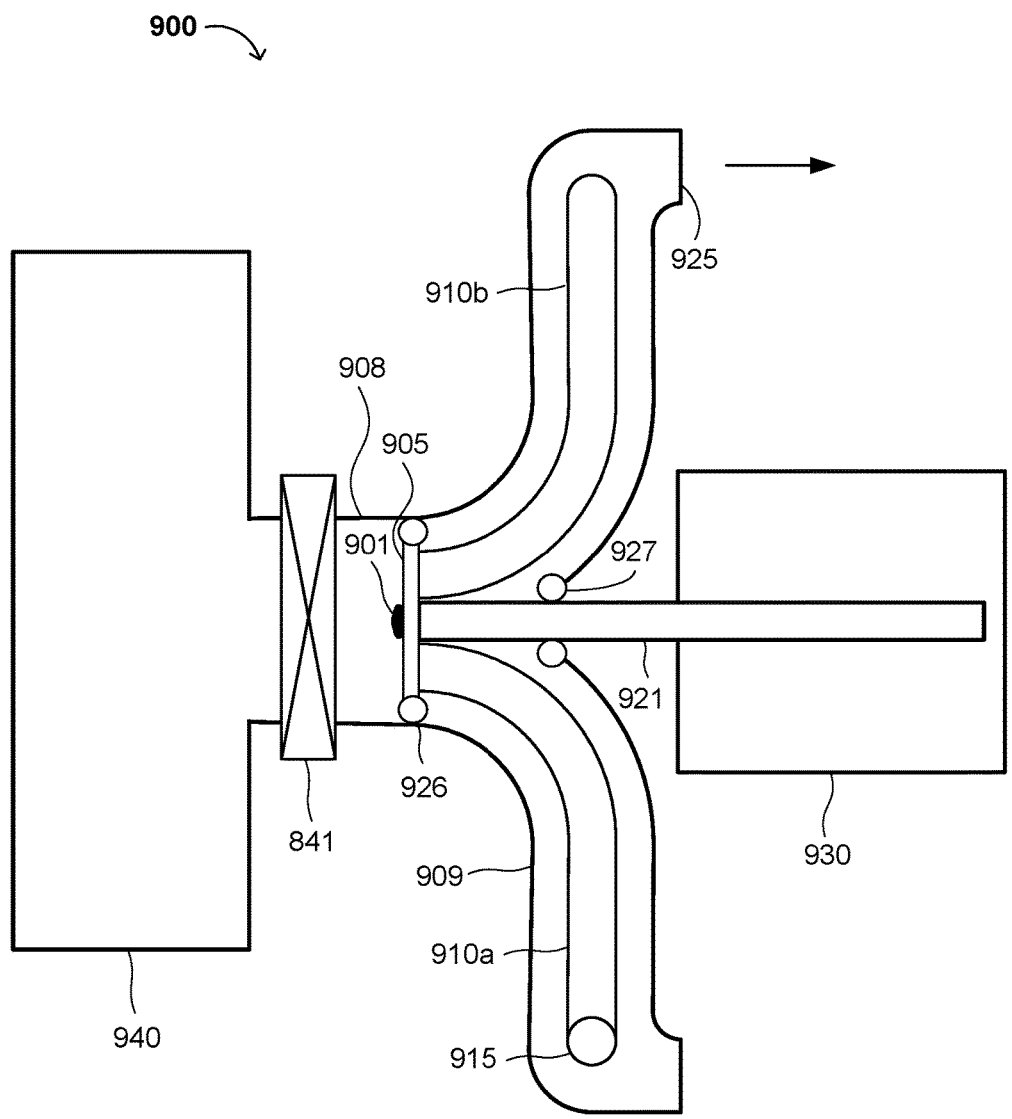
FIG. 9 is a cross-sectional view showing parts of an exemplary vacuum pump according to one or more embodiments of the present invention.

FIG. 9 is a cross-sectional view showing an exemplary vacuum pump 900 including an exemplary rotary jet according to one or more embodiments of the present invention. Similar to the rotary jets of FIGS. 1A-B, 3A-B and 8A-C, the rotary jet in the vacuum pump 900 generally comprises a central axle or shaft 921 having a cap 901, an inlet 905 configured to receive at least one gas-phase fluid, a plurality of radial arms 910*a-b* extending radially from the inlet 905, and nozzles 915 at a distal end of each rotating arm 910*a-b*. The nozzle on the rotating arm 910*b* is not shown because it faces away from the viewer. Although only two radial arms 910*a-b* are shown, the rotary jet in FIG. 9 is not limited thereto (e.g., the rotary jet may have n radial arms, where n is an integer and 360/n is an integer or regular fraction.

As shown in FIG. 9, the vacuum pump 900 may include a vacuum chamber 940 and a valve 941. The vacuum chamber 940 is generally sealed or otherwise configured to prevent fluids, such as air and other gas(es), from entering the chamber 940. In various embodiments, the vacuum chamber 940 has a latchable door or lid with a gas-tight seal (not shown) to enable placement of objects or items therein and withdrawal of objects or items therefrom. For example, the vacuum chamber 940 and the vacuum pump 900 may be configured to create or form a pressure of from 0.001 mTorr to 0.5 atm (or any value or rage of values therein) in the vacuum chamber 940.

In exemplary embodiments, the vacuum chamber 940 may have a rectangular cross-sectional shape. Alternatively, the vacuum chamber 940 may have a cross-section with a square or other polygonal shape. In addition, the vacuum chamber 940 may comprise or consist of a metal, a glass, a ceramic or a combination thereof (e.g., with a plastic or rubber) as described herein, and may have a double-walled structure (e.g., to improve the vacuum seal of the chamber). The vacuum chamber 900 has dimensions configured to enclose the object(s) and/or item(s) to be placed under a vacuum, and may be further equipped with one or more gas inlets and/or valves (not shown) for introducing a desired gas into the vacuum chamber 940 (e.g., to relieve the vacuum or replace oxygen in the chamber with a chemically inert gas, such as dinitrogen or argon).

In various embodiments, the valve 941 controls the flow rate of air and gas(es) removed from the vacuum chamber 940. The valve 941 is positioned between the vacuum chamber 940 and the inlet 905. The vacuum chamber 940 and the valve 941 may be connected to a housing 909 in the same or similar manner that the conduits or funnels 807*a-c* of FIGS. 8A-C are connected to the housing 809.

The housing 909 may be the same as or similar to the housing 809 of FIGS. 8A-C, except that a single exhaust opening 925 is present. As shown in FIG. 9, the housing 909 and the vacuum chamber 940 and valve 941 may be connected via a fitting 908. However, in some embodiments, the housing 909 may be connected directly to the vacuum chamber 940 and/or valve 941.

A motor 930 rotates the central axle or shaft 921, which rotates the radial arms 910*a-b* and optionally the inlet 905. The spinning radial arms 910*a-b* pull fluids (e.g., air, gases, volatile liquids, etc.) from the vacuum chamber 940 when the valve 941 is open, creating a vacuum in the vacuum chamber 940. The fluid(s) pulled into the radial arms 910*a-b* are subsequently expelled through the nozzles 915 and the opening 925 of the housing 909. When the desired or predetermined vacuum pressure is achieved in the vacuum chamber 940, the valve 941 is closed, and the central axle or shaft 921 may be disengaged from the motor 930 (or the motor 930 is turned off).

Figure 10:
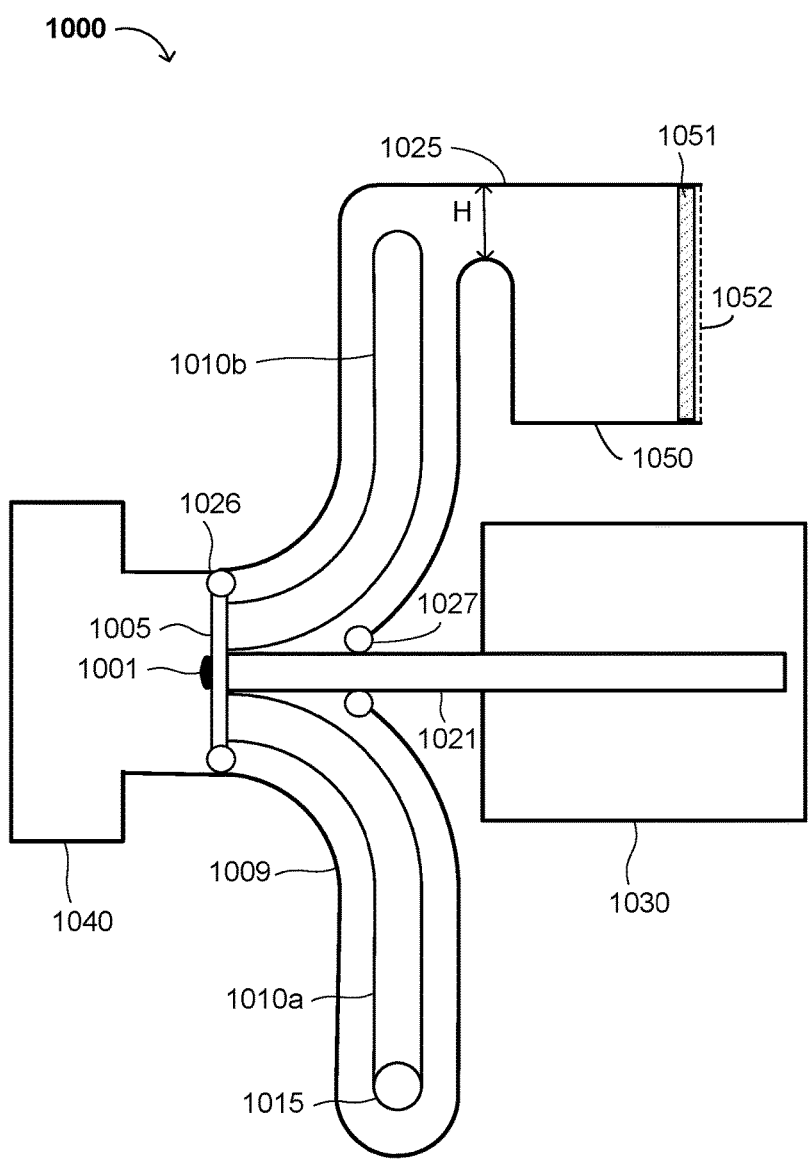
FIG. 10 is a cross-sectional view showing parts of an exemplary vacuum cleaner according to one or more embodiments of the present invention.

FIG. 10 is a cross-sectional view showing parts of an exemplary vacuum cleaner 1000 including an exemplary rotary jet according to one or more embodiments of the present invention. Similar to the rotary jets of FIGS. 1A-B, 3A-B, 8A-C and 5, rotary jet in the vacuum cleaner generally comprises a central axle or shaft 1021 having a cap 1001, an inlet 1005 configured to receive at least one fluid, a plurality of radial arms 1010*a-b* extending radially from the inlet 1005, and nozzles 1015 at a distal end of each rotating arm 1010*a-b*. The nozzle on the rotating arm 1010*b* is not shown because it faces away from the viewer. Although only two radial arms 1010*a-b* are shown, the rotary jet in FIG. 10 is not limited thereto (e.g., the rotary jet may have n radial arms, where n is an integer and 360/n is an integer or regular fraction.

As shown in FIG. 10, the vacuum cleaner 1000 may include a dust inlet 1040 configured to receive air and suspended particles and transport the air and particles to the radial arms 1010*a-b* through the rotary jet inlet 1005. In exemplary embodiments, the dust inlet 1040 may have a rectangular shape. Alternatively, the dust inlet 1040 may have a cross-section with a circular, oval, square or other polygonal shape. In addition, the dust inlet 1040 may comprise or consist of a plastic as described herein, a metal, a glass, a ceramic, or a combination thereof. In exemplary embodiments, the dust inlet 1040 has dimensions configured to (i) create a vacuum therein when the dust inlet 1040 is placed on an object (such as a floor) and (ii) facilitate the flow of air through the dust inlet 1040 and into the rotary jet inlet 1005. In some embodiments, the dust inlet 1040 may include a valve, duct or other mechanism (not shown) to control the amount of air supplied to the rotary jet.

The dust inlet 1040 may be connected to a housing 1009 in the same or a similar manner as the conduits or funnels 807*a-c* of FIGS. 8A-C are connected to the housing 809. The housing 1009 may be similar to the housing 809 of FIGS. 8A-C, except that housing 1009 includes a dust collector 1050, as shown in FIG. 10, and is generally smaller (e.g., it has dimensions enabling a person of average or below average size and strength to manipulate the vacuum cleaner 1000). Air and particles suspended in the air are expelled through the nozzles 1015 and into the dust collector 1050. In exemplary embodiments, the dust collector 1050 may have a cylindrical shape or a square or rectangular cross-section. Alternatively, the dust collector 1050 may have a cross-section with another polygonal and/or irregular shape. In various embodiments, the dust collector 1050 may comprise or consist of a plastic as described herein, a metal, a glass, a ceramic, fiberglass, rubber, or a combination thereof. In exemplary embodiments, the dust collector 1050 has dimensions sufficient to collect dust or dirt particles filtered from the air. The dust collector 1050 generally includes a filter 1051. Generally, air passes through the filter 1051 and out through a screen or mesh 1052. As shown in FIG. 10, the housing 1009 may be connected directly to the dust inlet 1040. In some embodiments, the housing 1009 and the dust inlet 1040 may be connected via a fitting (not shown). In exemplary embodiments, the dust collector 1050 can be removable (e.g., to dump out the dirt or dust particles and/or clean the filter 1051). In addition, the vacuum cleaner 10000 may have more than one dust collector 1050 (e.g., a second dust collector connected to the housing 1009 on an opposite side of the motor 1030).

In exemplary embodiments, the motor 1030 rotates the arms 1010*a-b* and the inlet 1005, and the air is pulled through the dust inlet 1040 and rotary jet inlet 1005 by the rotating radial arms 1010*a-b*. The air and the suspended dust or dirt particles are subsequently expelled through the nozzles 1015 and into the dust collector 1050 attached to the housing 1009. The outlet 1025 between the housing 1009 and the dust collector 1050 may have a width (i.e., dimension along the axis perpendicular to the plane of the page) of from about the height H of the outlet 1025 to the width of the dust collector 1050. A motor 1030 rotates the central axle or shaft 1021, which rotates the radial arms 1010*a-b* and optionally the inlet 1005. The spinning radial arms 1010*a-b* draw air into the rotary jet inlet 1005, creating a vacuum in the space over the dust inlet 1040. The air that is pulled into the radial arms 1010*a-b* is subsequently expelled through the nozzles 1015 and into the dust collector 1050.

Figure 11:
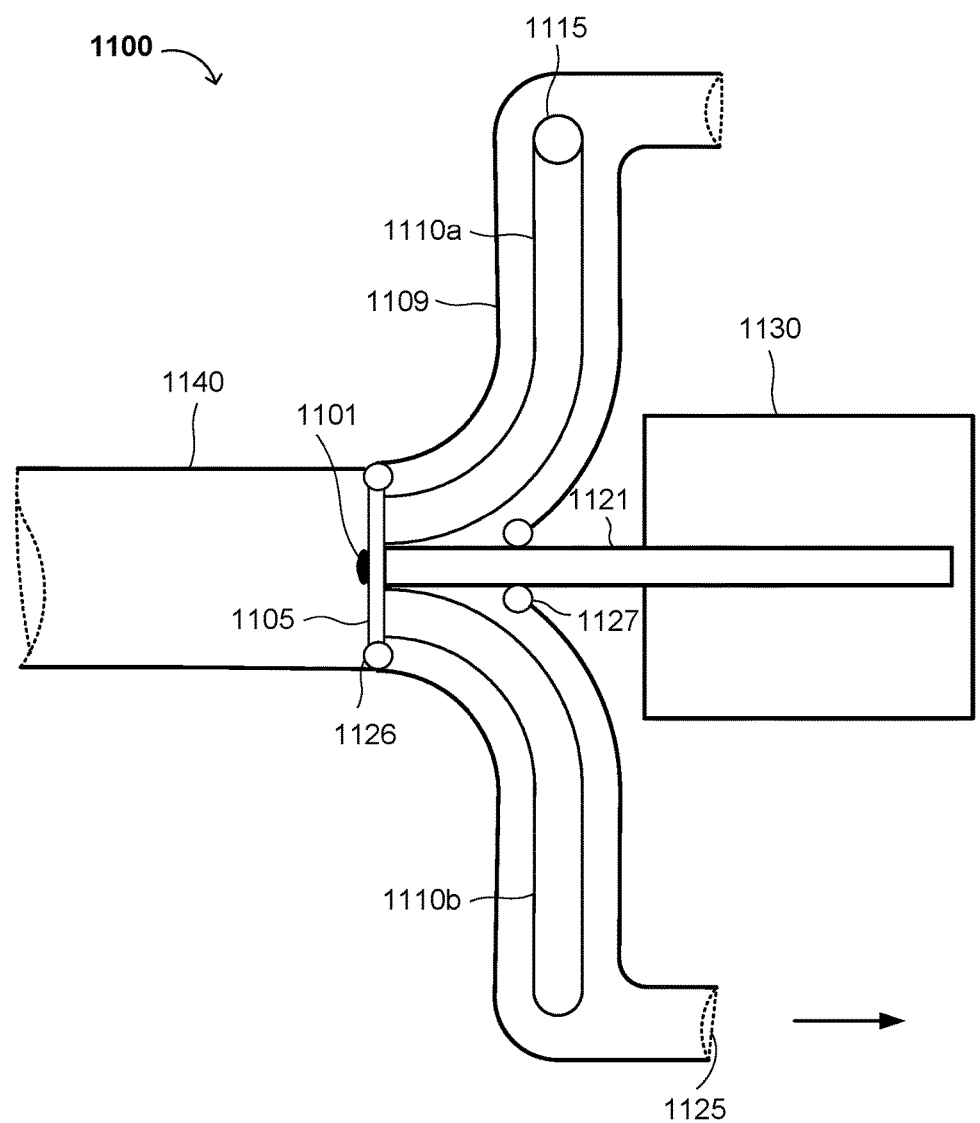
FIG. 11 is a cross-sectional view showing an exemplary water pump according to one or more embodiments of the present invention.

FIG. 11 is a cross-sectional view showing an exemplary water pump 1100 including the present rotary jet according to one or more embodiments of the present invention. Similar to the rotary jets of FIGS. 1A-B, 3A-B, 8A-C and 10, the rotary jet in the water pump 1100 generally comprises a central axle or shaft 1121 having a cap 1101, an inlet 1105 configured to receive at least one fluid, a plurality of radial arms 1110*a-b* extending radially from the inlet 1105, and nozzles 1115 at a distal end of each rotating arm 1110*a-b*. The nozzle on the rotating arm 1110*b* is not shown because it faces away from the viewer. Although only two radial arms 1110*a-b* are shown, the rotary jet in FIG. 11 is not limited thereto (e.g., the rotary jet may have n radial arms, where n is an integer and 360/n is an integer or regular fraction).

As shown in FIG. 11, the water pump 1100 may include a conduit 1140 that is configured to transport water to the inlet 1105. In exemplary embodiments, the conduit 1140 may have a cylindrical or tube-like shape. Alternatively, the conduit 1140 may have a cross-section with an oval, square, rectangular, or other polygonal shape. The conduit 1140 may comprise or consist of a plastic, a metal, a glass, a ceramic, porcelain, concrete, a rubber, fiberglass, or a combination thereof, as described herein. The conduit 1140 has dimensions sufficient to facilitate the flow of a liquid-phase fluid, such as water. In some embodiments, the water pump 1100 may include a valve (not shown) to control the amount of fluid transported from the conduit 1140 to the rotary jet (e.g., the inlet 1105).

The conduit 1140 may be connected to a housing 1109 in substantially the same or a similar manner as the conduits or funnels 807*a-c* of FIGS. 8A-C are connected to the housing 809. The housing 1109 may be substantially the same as or similar to the housing 809 of FIGS. 8A-C, except for outlet(s) 1125 that are located at the distal ends of the housing 1109. As shown in FIG. 11, the housing 1109 may be connected directly to the conduit 1140. In some embodiments, the housing 1109 and the conduit 1140 may be connected via a fitting (not shown).

A motor 1130 rotates the central axle or shaft 1121, which rotates the radial arms 1110*a-b* and optionally the inlet 1005. The spinning radial arms 1110*a-b* pull or pumps water from the conduit 1140 to the outlet 1125 (which may be another conduit). The motor 1130 may be electrical, gas or oil powered, mechanical, etc.

Figure 12:
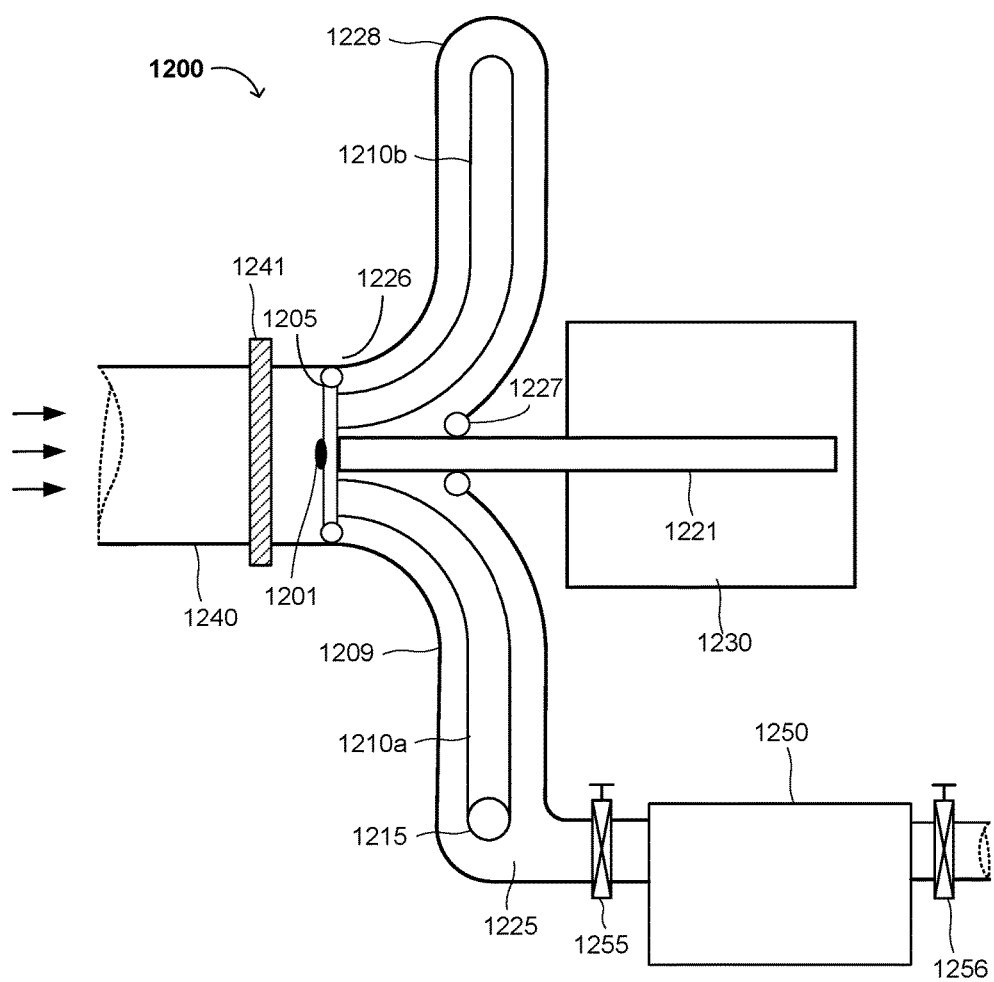
FIG. 12 is a cross-sectional view showing an exemplary air compressor according to one or more embodiments of the present invention.

FIG. 12 is a cross-sectional view showing an exemplary air compressor 1200 including the rotary jet according to one or more embodiments of the present invention. Similar to the rotary jets of FIGS. 1A-B, 3A-B, 8A-C and 10, the rotary jet in the air compressor 1200 generally comprises a central axle or shaft 1221 having a cap 1201, an inlet 1205 configured to receive at least one fluid, a plurality of radial arms 1210*a-b* extending radially from the inlet 1205, and nozzles 1215 at a distal end of each rotating arm 1210*a-b*. The nozzle on the rotating arm 1210*b* is not shown because it faces away from the viewer. Although only two radial arms 1210*a-b* are shown, the rotary jet in FIG. 12 is not limited thereto (e.g., the rotary jet may have n radial arms, where n is an integer and 360/n is an integer or regular fraction).

The air compressor 1200 may include a conduit 1240. The conduit 1240 is generally configured to receive air and supply the air to the radial arms 1210*a-b* through the inlet 1205. The conduit is similar to the conduit 807*a* of FIG. 8A. In some embodiments, the conduit 1240 may include a filter 1241 that is configured to minimize or eliminate solid-phase particles that might otherwise enter the conduit 1240. Generally, the filter 1241 may have a pore size of about 0.1 µm-10 mm, any value or range therein. In various embodiments, the filter may be inserted or removed through a slot in the conduit 1240 or fitting (not shown). The conduit 1240 is connected to a housing 1209 in substantially the same or similar manner as the conduits or funnels 807*b-c* of FIGS. 8B-C are connected. The housing 1209 is similar to the housing 809 of FIGS. 8A-C, except that housing 1209 includes a closed circumferential end 1228, and is connected to a compressed air tank 1250, as shown in FIG. 12.

In exemplary embodiments, air is pulled into the radial arms 1210*a-b* from the conduit 1240 through the inlet 1205 by rotating the radial arms 1210*a-b*. The radial arms 1210*a-b* are connected to the central axle or shaft 1221, which is rotated by the motor 1230. Motor 1230 can be electric, fuel-driven, mechanical, etc. Rotation or spinning of the radial arms 1210*a-b* forces the air along the radial arms 1210*a-b*. The air from the radial arms 1210*a-b* is subsequently expelled through the nozzles 1215 and through an opening 1225 in the housing 1209 into the compressed air tank 1250. In various embodiments, the compressed air tank 1250 may have a rectangular or cylindrical shape. Alternatively, the compressed air tank 1250 may have a cross-section with an oval, square or other polygonal shape. The air compressor 1200 may include one or more valves 1255 and 1256. Valve 1255 is on a first side of the compressed air tank 1250 to control or regulate the amount of air being supplied to the compressed air tank 1250. Valve 1256 is on a second side of the compressed air tank 1250 to control or regulate the amount being expelled or released from the compressed air tank 1250.

Figure 13:
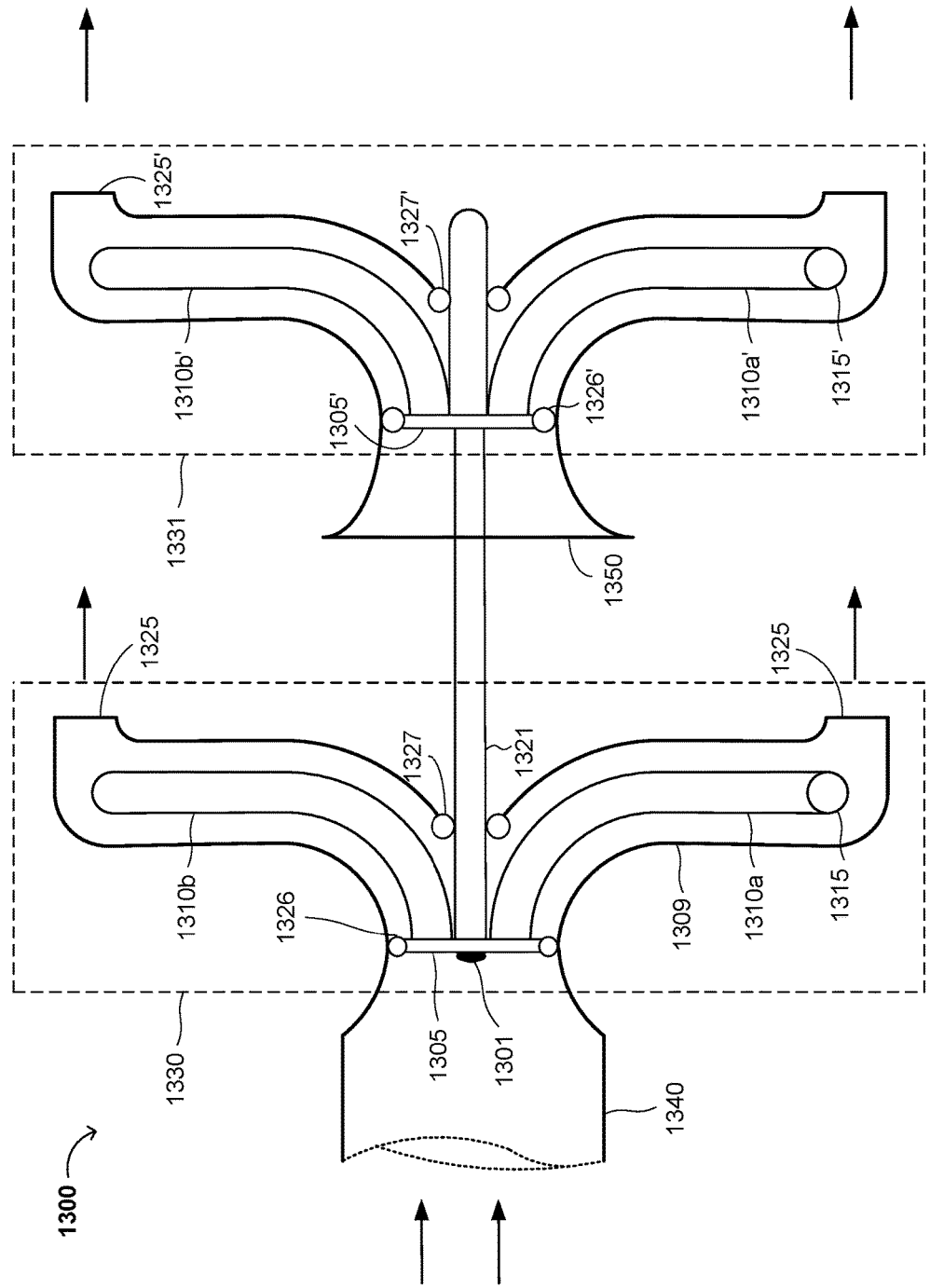
FIG. 13 is a cross-sectional view showing an exemplary turbocharger according to one or more embodiments of the present invention.

FIG. 13 is a cross-sectional view showing an exemplary turbocharger 1300 including the exemplary rotary jet according to one or more embodiments of the present invention. The turbocharger 1300 generally comprises a gas or wind energy conversion unit 1330 and an air compressor unit 1331. The gas or wind energy conversion unit 1330 comprises a first inlet 1305 configured to receive flowing air, a first plurality of radial arms 1310*a-b* extending radially from the central axle or shaft 1321, and first set of nozzles 1315 at a distal end of each rotating arm 1310*a-b*. The air compressor 1331 comprises a second inlet 1305' configured to receive flowing air passing through and/or around the gas or wind energy conversion unit 1330, a second plurality of radial arms 1310*a-b'* extending radially from the second inlet 1305', and second set of nozzles 1315' at a distal end of each radial arm 1310*a-b'*. The second inlet 1305' may be further configured to receive some or substantially all of the fluid expelled from the gas or wind energy conversion unit 1330. Both the gas or wind energy conversion unit 1330 and the air compressor 1331 may include a common central axle or shaft 1321 and the cap 1301. The nozzles on the rotating arms 1310*b* and 1310*b'* are not shown because they face away from the viewer. Although only two radial arms 1310*a-b* and 1310*a'-b'* are shown in each rotary jet, the rotary jets in FIG. 13 are not limited thereto (e.g., the rotary jets may have n radial arms, where n is an integer and 360/n is an integer or regular fraction).

Generally, the gas or wind energy conversion device 1330 converts the potential energy of a flowing gas or air to mechanical energy. The gas or wind energy conversion device 1330 includes a first funnel or collector 1340 that is configured to receive a flowing gas (e.g., hot exhaust from a fuel combustion chamber) through a first inlet 1305. In exemplary embodiments, the first funnel or collector 1340 may have a conical, cylindrical or tube-like shape. Alternatively, the first funnel or collector 1340 may have a cross-section with an oval, square, rectangular, or other polygonal shape. The first funnel or collector 1340 may comprise or consist of a plastic, a metal, a glass, a ceramic, a rubber, fiberglass, or a combination thereof, as described herein. In exemplary embodiments, the first funnel or collector 1340 may include a non-stick polymer or ceramic coating (to deflect or facilitate removal of debris, combusted fuel particles [e.g., carbon], etc.). The first funnel or collector 1340 has dimensions to fit into an engine compartment of a vehicle, such as an airplane or jet, etc. In addition, the first funnel or collector 1340 may have dimensions to facilitate the flow of a gas-phase fluid and its concentration or compression at the inlet 1305. In some embodiments, the turbocharger 1300 may include a valve (not shown) to control the amount of fluid transported to the rotary jet.

The first funnel or collector 1340 may be connected to a housing 1309 in substantially the same or a similar manner as the conduits or funnels 807*a-c* of FIGS. 8A-C are connected to the housing 809. The housing 1309 may be similar to the housing 809 of FIGS. 8A-C, except that the housing 1309 needs to be heat resistant. As shown in FIG. 13, the housing 1309 may be connected directly to the first funnel or collector 1340. In some embodiments, the housing 1309 and the first funnel or collector 1340 may be connected via a fitting (not shown).

Hot exhaust received from the first funnel or collector 1340 is supplied to the first radial arms 1310*a-b* through the first inlet 1305, causing the first radial arms 1310*a-b* to rotate around the central axle or shaft 1321, as described herein. The rotation or spinning of the first radial arms 1310*a-b* forces the exhaust along the radial arms 1310*a-b* (e.g., by centrifugal force), and the exhaust is expelled through the nozzles 1315 and the opening 1325 of the first housing 1309. The shape of the opening 1325 is substantially curved and is parallel with the central axle or shaft 1321 optimizing the thrust or rotational force.

In exemplary embodiments of the air compressor 1331, the second funnel or collector 1350 is configured to (i) receive air passing through or around the gas or wind energy conversion device 1330 and optionally from the first opening 1325 of the first housing 1309 and (ii) supply the air (and exhaust, when present) to a second set of radial arms 1310*a-b*' through the second inlet 1305'. The second funnel or collector 1350' may have a shape that is substantially the same or similar to the first funnel or collector 1350. Alternatively, the second funnel or collector 1350' has a flared or curved cross-sectional shape, as shown in FIG. 13. The second funnel or collector 1350' may have a cross-section with a circular, oval, square, rectangular, or other polygonal shape. In exemplary embodiments, the second funnel or collector 1350' has dimensions sufficient to facilitate the collection and/or concentration of air at the inlet 1305'. In exemplary embodiments, the dimensions may be different (e.g., smaller) than those of the first funnel or collector 1350 of the gas or wind energy conversion device 1330. However, the dimensions may be substantially the same or similar to the first funnel or collector 1350. Alternatively, the dimensions may be different than the first funnel or collector 1350.

Air or an air/exhaust mixture is supplied to the second radial arms 1310*a*'-b' through the second inlet 1305,' causing the second radial arms 1310*a*'-b' to rotate around the central axle or shaft 1321, as described herein. The rotation or spinning of the second radial arms 1310*a*'-b' forces the air or air/exhaust mixture along the radial arms 1310*a*'-b', and the air or air/exhaust mixture is expelled through a second nozzle 1330' and the second openings 1325' of the second housing 1309'. In exemplary embodiments, the dimensions of the radial arms 1310*a*'-b' and/or the housing 1309' may be different (e.g., smaller) from those of the radial arms 1310*a-b* and/or the housing 1309 in the gas or wind energy conversion device 1330.

The rotating radial arms 1310*a-b* in the gas or wind energy conversion 1330 rotate the central axle or shaft 1321, the central axle or shaft 1321 rotates the radial arms 1310*a*'-b' of the air or gas compressor 1331, and the air or gas compressor 1331 pulls air into the engine chamber, concentrates the air at the inlet 1305', and expels the air out the second outlet(s) 1325', thereby using air in the engine chamber as a propellant.

The present turbocharger 1300 may be used in a drone (e.g., for human flight). Generally, with drones, if the battery and/or engine is too large, the drone may not be able to take off and/or fly. However, if the battery is relatively small, the resulting flight time may be undesirably short, and if an engine is relatively small, it may not be able to carry a large payload (e.g., one or more human passengers and/or operators). The present turbocharger 1300 provides an efficient mechanism for maximizing the work produced from a given supply of energy, advantageously enabling larger payloads and/or longer flight times than conventional drone engine technology.

Figure 14:
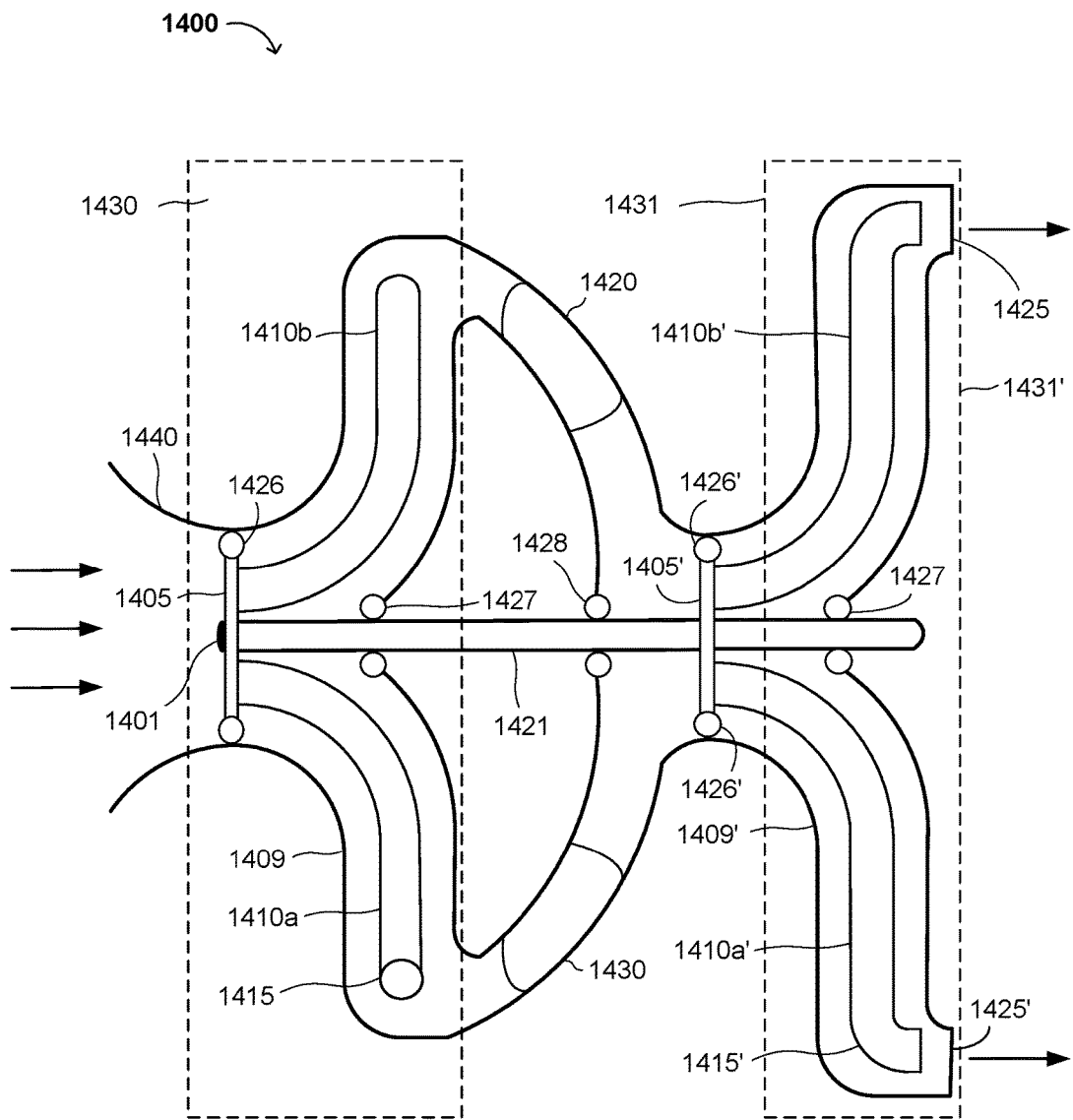
FIG. 14 is a cross-sectional view showing an exemplary rotary jet-based engine according to one or more embodiments of the present invention.

FIG. 14 is a cross-sectional view of an exemplary rotary jet-based engine 1400 including two rotary jets according to one or more embodiments of the present invention. Engine 1400 may include an air compressor 1430, at least one combustion chamber(s) 1420, and a propulsion device 1431. The air compressor 1430 may comprise a funnel or air collector 1440, an inlet 1405 configured to receive compressed air, a plurality of radial arms 1410*a-b* in a housing 1409 attached to the funnel or air collector 1440, as described herein. The radial arms 1410*a-b* extend radially from the central axle or shaft 1421, and a nozzle 1415 at a distal end of each rotating arm 1410*a-b*. The funnel or collector 1440 is configured to receive air and funnel the air to the inlet 1405. The funnel or collector 1440 may be connected to a housing 1409 in substantially the same or similar manner as the conduits or funnels 807*b-c* of FIGS. 8B-C are connected to the housing 809. The propulsion device 1431 comprises an inlet 1405' configured to receive exhaust from the combustion chamber(s) 1420, a housing 1409' attached to the inlet 1405', a plurality of radial arms 1410*a-b*' extending radially from the central axle or shaft 1421, and nozzles 1415' at a distal end of each rotating arm 1410*a-b*'.

Similar to the rotary jets of FIGS. 1A-B, 3A-B, 8A-C and 13, the engine 1400 generally comprises a central axle or shaft 1421 having a cap 1401. The nozzles 1415 and 1415' on the rotating arms 1410*b* and 1410*b*' are not shown because they face away from the viewer. Although only two radial arms are shown in each of the air compressor 1430 and the propulsion device 1431, the rotary jets in FIG. 14 are not limited thereto (e.g., the rotary jets may have n radial arms, where n is an integer and 360/n is an integer or regular fraction). The engine 1400 may be useful as or in a jet engine or other propulsion engine that advantageously combines an air compressor and a fluid energy conversion unit.

Fuel combusting or detonating in the combustion chamber(s) 1420 expands along with the air in the combustion chamber(s) 1420 and in the exhaust space 1422, and travels through the inlet 1405'. The hot exhaust/air mixture rotates the radial arms 1410*a*'-b' and drives the shaft 1421, which in turn rotates the radial arms 1410*a-b*, pulling in more air through the first inlet 1405 and compressing more air in the housing 1409.

The fuel (e.g., ammonium nitrate powder, ammonia gas, hydrazine, carbon-based materials such as propane, methane, natural gas, gasoline, diesel or jet fuel, cellulose powder, etc.) may be injected into the combustion chamber 1420 using at least one feed lines, valves, injection ports, etc. (not shown). The combustion chamber(s) 1420 may include multiple combustion chambers arranged radially around the shaft 1421 similarly to the radial arms in other figures, in which fuel is ignited to further increase the temperature and pressure of the influent air. For further details regarding combustion chamber(s) 1420, see U.S. patent application Ser. Nos. 14/508,898 and 15/046,965 ,filed Jun. 17, 2015 and Feb. 18, 2016, respectively, the relevant portions of which are incorporated herein by reference.

In various embodiments, the first housing 1409 encloses or substantially encloses the first inlet 1405, bearings 1426 and 1427 (which allow the shaft 1421 to rotate inside the fixed housing 1409), an upper portion of the central axle or shaft 1421, the first plurality of radial arms 1410*a-b*, and the first plurality of nozzles 1415. As shown in FIG. 14, the first housing 1409 connects directly to the funnel or collector 1440. The first housing 1409 may have an oval, circular, square, rectangular, or other regular or irregular polygonal shape, suitable to enclose the first inlet 1405, the first radial arms 1410*a-b*, and the first nozzles 1415. The dimensions of the first housing 1409 may vary depending on the dimensions of the first inlet 1405, the first plurality of radial arms 1410*a-b*, and the nozzles 1415. Generally, the housing 1409 includes openings 1425 having a shape configured to allow and/or optimize flow and compression of the air after it is expelled from the nozzles 1415. The compressed air enters into the combustion chamber(s) 1420. The housing 1409, the combustion chamber 1420, and the exhaust space 1422 curves toward the second inlet 1405' in the propulsion device 1431, as shown in FIG. 14. In exemplary embodiments, the combustion chamber(s) 1420 are static.

In exemplary embodiments, air is pulled into the radial arms 1410*a-b* from the funnel or air collector 1440 through the inlet 1405 by rotation of the radial arms 1410*a-b*. The radial arms 1410*a-b* are connected to the central axle or shaft 1421. The air from the rotation or spinning of the radial arms 1410*a-b* goes to the combustion chamber 1420 at a higher pressure than atmospheric pressure (e.g., from 2 to 1000 atm or more, or any value or range of values therein). Fuel combusting or detonating in the chamber(s) 1420 expands along with air in the chamber(s) 1420 and in the exhaust space, and goes through the inlet 1405' at an even higher pressure (e.g., from 20 to 10,000 atm or more, or any value or range of values therein). The exhaust passing through the propulsion device 1431 rotates the radial arms 1410*a'-b'* and drives shaft 1421, which in turn rotates the radial arms 1410*a-b*, pulling in and compressing additional air in the housing 1409. Subsequently, the exhaust/air mixture in the propulsion device 1431 is expelled through the nozzles 1415' and through one or more openings 1425' in the housing 1409'.

The fuel is supplied to combustion chamber(s) 1420 through a valve, injection port, etc. (not shown). The second plurality of radial arms 1410*a'-b'* may be similar to or substantially the same as the first plurality of radial arms 1410*a-b*. Since the exhaust/air mixture entering the second inlet 1405' may be quite hot, the second plurality of radial arms 1410*a'-b'* may be different from the first radial arms 1410*a-b* (e.g., resistant to or tolerant of high temperatures, such as in the range of 500-1500° C., or any value or range of values therein). The second housing 1409' may be substantially the same or similar to the first housing 1409, but is not limited thereto, and may be larger or smaller (and is also generally heat-resistant and/or -tolerant). The present engine 1400 may advantageously eliminate a requirement for an external compressor.

Figure 15:
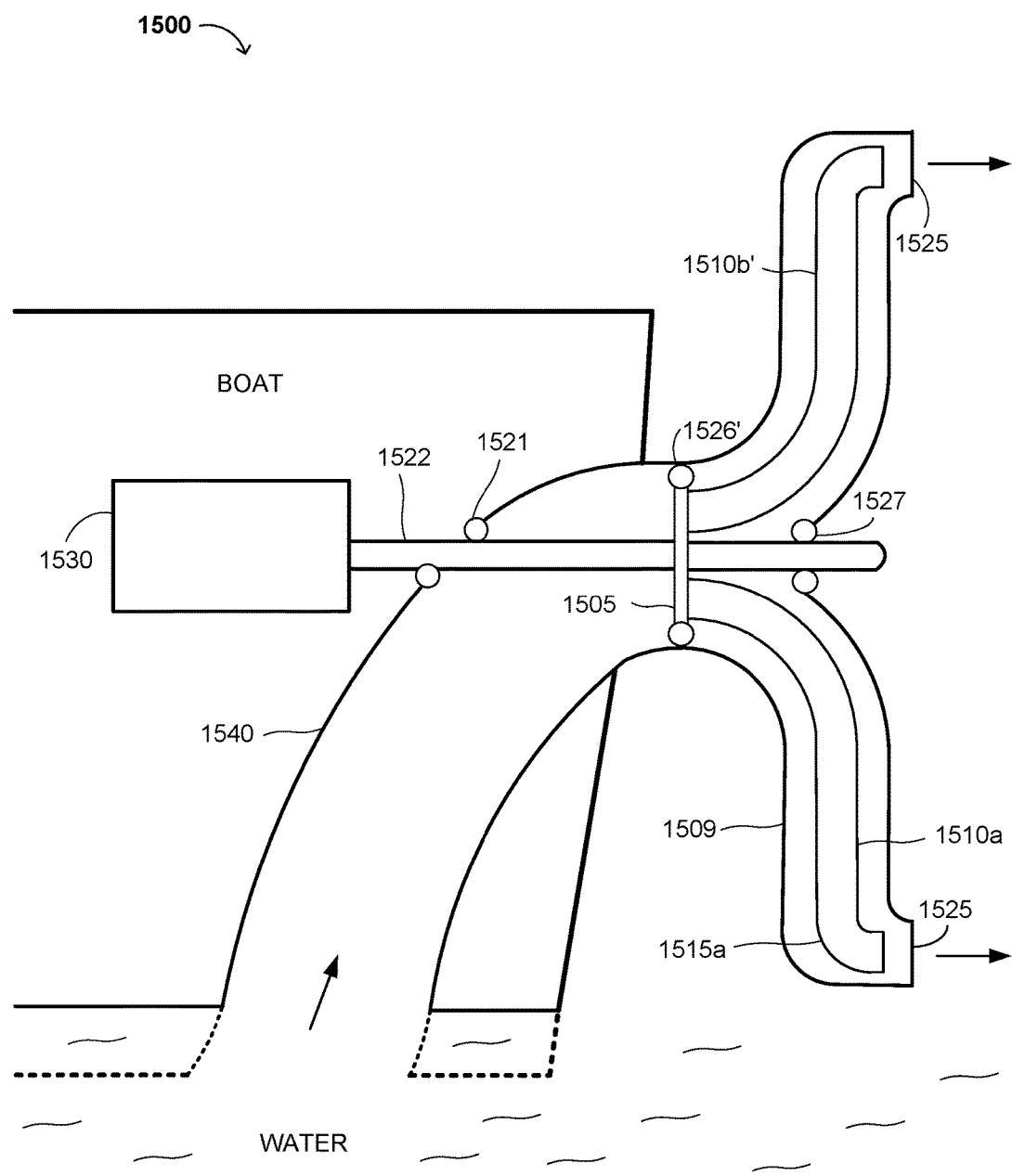
FIG. 15 is a cross-sectional view showing an exemplary waterjet propulsion vehicle (e.g., boat) according to embodiments of the present invention.

FIG. 15 is a cross-sectional view showing an exemplary waterjet propulsion vehicle (e.g., boat) 1500 including the present rotary jet according to one or more embodiments of the present invention. Similar to the rotary jets of FIGS. 1A-B, 3A-B, 8A-C and 9-13, the rotary jet in the waterjet propulsion vehicle 1500 generally comprises a central axle or shaft 1521, an inlet 1505 configured to receive at least one fluid (e.g., water), which may be connected to a housing 1509, a plurality of radial arms 1510*a-b* extending radially from the inlet 1505, and nozzles 1515 at a distal end of each radial arm 1510*a-b*. The nozzle on the radial arm 1510*b* is not shown because it faces away from the viewer. Although only two radial arms 1510*a-b* are shown, the rotary jet in FIG. 15 is not limited thereto (e.g., the rotary jet may haven radial arms, where n is an integer and 360/n is an integer or regular fraction).

The waterjet propulsion vehicle 1500 may include a duct 1540 that is configured to receive fluid (e.g., water) and transport the water to the radial arms 1510*a-b* through the inlet 1505. In exemplary embodiments, the duct 1540 may have a cylindrical, tubular or other elongated shape that has a first end submerged in the water and a second end connected to the housing 1509. The connection between the duct 1540 and the housing 1509 are substantially the same as or similar to the connection between the conduits or funnels 840 and the housing 809 of FIGS. 8A-C. The housing 1509 is substantially the same or similar to the housing 809 of FIGS. 8A-C. In addition, the duct 1540 may comprise or consist of a plastic as described herein, a metal, a ceramic, a rubber, or a combination thereof. In exemplary embodiments, the duct 1540 has dimensions sufficient to facilitate the flow and/or transportation of water.

The waterjet propulsion vehicle 1500 includes a motor 1530 that rotates the central axle or shaft 1501 to generate a rotational force that propels the vehicle 1500 and provides suction of water through the duct 1540. The motor 1530 rotates the central axle or shaft 1521, causing the radial arms 1510*a-b* to rotate around the central axle or shaft 1521 as described herein, thereby pulling water through the duct 1540. In exemplary embodiments, the motor 1530 may be electric, combustion, mechanical, etc. The rotating or spinning radial arms 1510*a-b* force the water along the radial arms 1510*a-b* (e.g., by centrifugal force), and the water is subsequently expelled through the nozzles 1515 and the opening(s) 1525 of the housing 1509. In exemplary embodiments, the opening 1525 of the housing 1509 faces in the direction opposite to the travelling direction of the boat. In alternative embodiments, the nozzles 1515 may point in a direction parallel to the central axle or shaft 1521, and/or expel or eject the water directly through the opening(s) 1525 (e.g., without touching the housing 1509). In a further alternative, the housing 1509 is absent. The expelled water functions as a propulsion force for the boat 1500.

Generally, liquids have a much higher density than gases. For example, at 20° C., the density of water is about 999.2 kg/m$^3$, whereas the density of air is about 1.2 kg/m$^3$ at the same temperature (at 1 atm pressure). The centrifugal force equals m·w$^2$·r, in which m is the mass of the material passing through the radial arms, w is the rotation speed or rate of the radial arms, and r is the radius of rotation. Thus, water is more effective in generating propulsion power than gases. A similar system may be implemented in a submarine. However, the entire rotary jet is immersed under water, and the entrance to the duct may be in the front or underside of the submarine.

Figure 16:
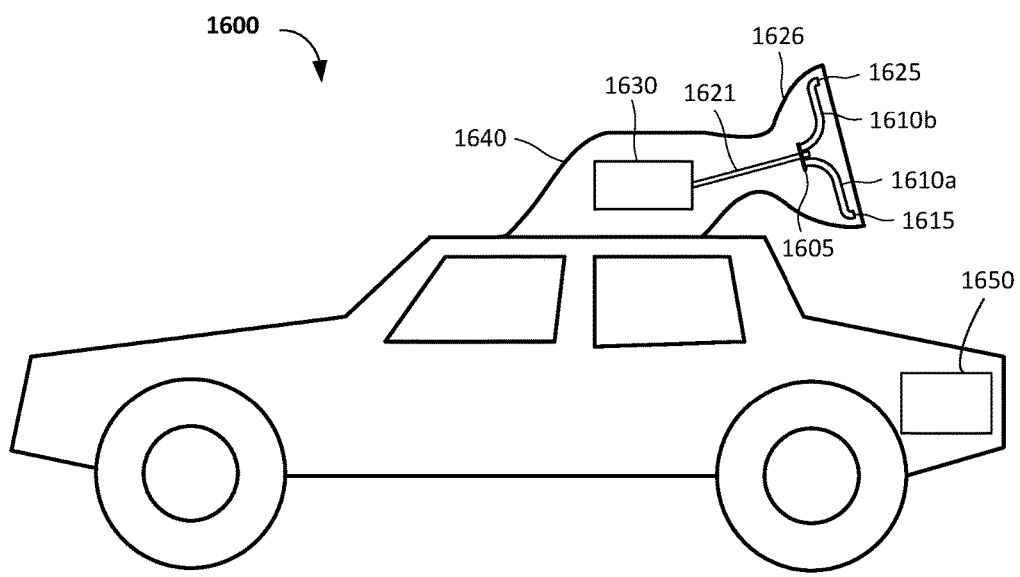
FIG. 16 is a cross-sectional view showing another exemplary waterjet propulsion vehicle (e.g., a car) according to embodiments of the present invention.

FIG. 16 is a cross-sectional view showing another exemplary waterjet propulsion vehicle (e.g., a car) 1600 including the present rotary jet according to embodiments of the present invention. Similar to the rotary jets of FIGS. 1A-B, 3A-B, 8A-C and 9-15, the rotary jet in the waterjet propulsion vehicle 1600 generally comprises a central axle or shaft 1621, an inlet 1605 configured to receive at least one fluid (water) and provide the fluid to the radial arms 1610*a-b* extending radially from the shaft 1621, and nozzles 1615 at a distal end of each rotating arm 1610*a-b*.

As shown in FIG. 16, the waterjet propulsion vehicle 1600 is a car. The waterjet propulsion vehicle 1600 may include other ground vehicles in alternative embodiments. The waterjet propulsion vehicle 1600 may include a housing 1640 for the rotary jet and a water tank 1650. The housing 1640 encloses or encapsulates the present rotary jet and a motor 1630. The housing 1640 may have any of various shapes and dimensions that facilitate housing such items. In exemplary embodiments, the housing 1640 may be connected to the roof of the car 1600. Alternatively, the housing 1640 may be connected to another area of the car, such as the trunk or hind panel. The housing 1640 may be tiltable vertically (e.g., to enable increased or decreased frictional force with the ground) and have a reversible horizontal direction, depending on whether the vehicle 1600 is intended to move forward or in reverse. Connection of the housing 1640 to the vehicle 1600 may include bolts or welding.

In exemplary embodiments, water is supplied to the rotary jet via a tube or pipe (not shown) from the water tank 1650. The tube or pipe may be connected to the inlet 1605 as shown in FIGS. 3A, 5 and 6. The water tank 1650 generally is configured to hold a relatively large volume of water (e.g., from 100 to 1000 L, or any value or range of values therein).

Generally, the water tank 1650 is stored in the trunk area of the vehicle. Alternatively, the water tank may be stored in another area of the vehicle (e.g., below the passenger compartment). As shown in FIG. 16, the water tank 1650 has a substantially cubic shape. Alternatively, the water tank 1650 may have a cylindrical or irregular shape, or another shape having one or more polygonal cross-sections. The dimensions of the water tank 1650 may vary depending on the amount of fluid that is stored in the water tank 1650.

In exemplary embodiments, water is supplied to the radial arms 1610*a-b* through the inlet 1605, causing the radial arms 1610*a-b* to rotate around the central axle or shaft 1621, as described herein. The rotation or spinning of the radial arms 1610*a-b* forces the water along the radial arms 1610*a-b* by centrifugal force, and the water is subsequently expelled through the nozzles 1615 and the openings 1625 of the housing 1609. The rotation or spinning of the radial arms 1610*a-b* also draws additional water into the inlet 1605 from the tank 1650, thereby effectively eliminating a need for a pump to transport the water from the tank 1650 to the inlet 1605. In exemplary embodiments, the opening 1625 of the housing 1609 faces in the opposite direction to the travelling direction of the vehicle.

Water may be expelled from the nozzle 1615 and the opening 1625 of the housing 1640 as an aerosol or mist, thereby providing a thrust force without causing undue damage to the vehicle 1600, the roadway on which the vehicle 1600 travels, or the surrounding environment. The opening 1625 may face in a direction opposite to that of the direction of travel of the vehicle 1600. The direction in which the fluid is expelled is adjustable. For example, water may jet out the nozzle 1615 towards the back end of the vehicle, propelling the vehicle forward. Alternatively, the housing 1640, rotary jet and/or central shaft 1621 may rotate horizontally and/or vertically, enabling the water to jet out the nozzle 1615 and opening 1625 of the housing 1640 towards the front end of the vehicle 1600 and allowing the vehicle 1600 to go into reverse, or assisting the vehicle 1600 to stop more efficiently (e.g., by pointing the rotary jet and/or opening 1625 up) or accelerate or maintain speed more efficiently (e.g., by pointing the rotary jet and/or opening 1625 down).

In exemplary embodiments, the motor 1630 rotates the central axle or shaft 1601 to rotate the radial arms 1610*a-b*. Power for the motor 1630 may be supplied from a battery located elsewhere in the vehicle 1600. Furthermore, the vehicle 1600 may further include a conventional electric, internal combustion or hybrid engine. As a result, the present rotary jet may advantageously improve fuel efficiency and/or battery range. In addition, the present rotary jet may advantageously decrease or minimize pollutants in the air by mixing the expelled water vapor with exhaust from the vehicle and/or existing pollutants and/or contaminants in the air.

Figure 17:
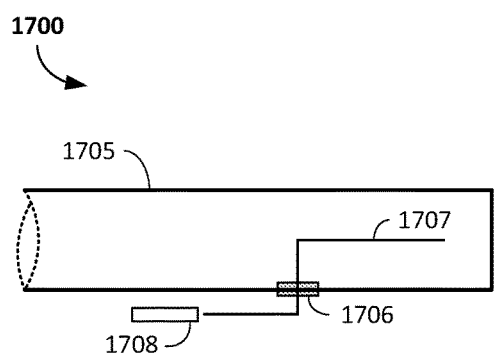
FIG. 17 is a cross-sectional view showing an exemplary ionization pin useful for the waterjet propulsion vehicle of FIG. 16.

FIG. 17 is a cross-sectional view showing an exemplary ionization or vaporization device 1700 for the waterjet propulsion vehicle of FIG. 16. In one embodiment, the ionization or vaporization device 1700 may be a high voltage ionization pin 1700. A high voltage (e.g., of at least 20 V and as high as 1000 V, or any value or range of values therein) may be supplied via a conduit 1705 connected to an ionization pin 1707 at the entrance to the inlet 1605 or along the radial arms 1610*a-b* of FIG. 16 to charge and/or vaporize the water into a mist or aerosol jet, advantageously creating a greater thrust and possibly further reducing pollutants in the air. The ionization pin 1707 may be connected through a gasket 1706 to a predetermined voltage generated from a voltage generator 1708. In addition, a small amount of air freshener may be added to the water tank 1650 of FIG. 16, advantageously minimizing and/or eliminating various odors.

Figure 18:
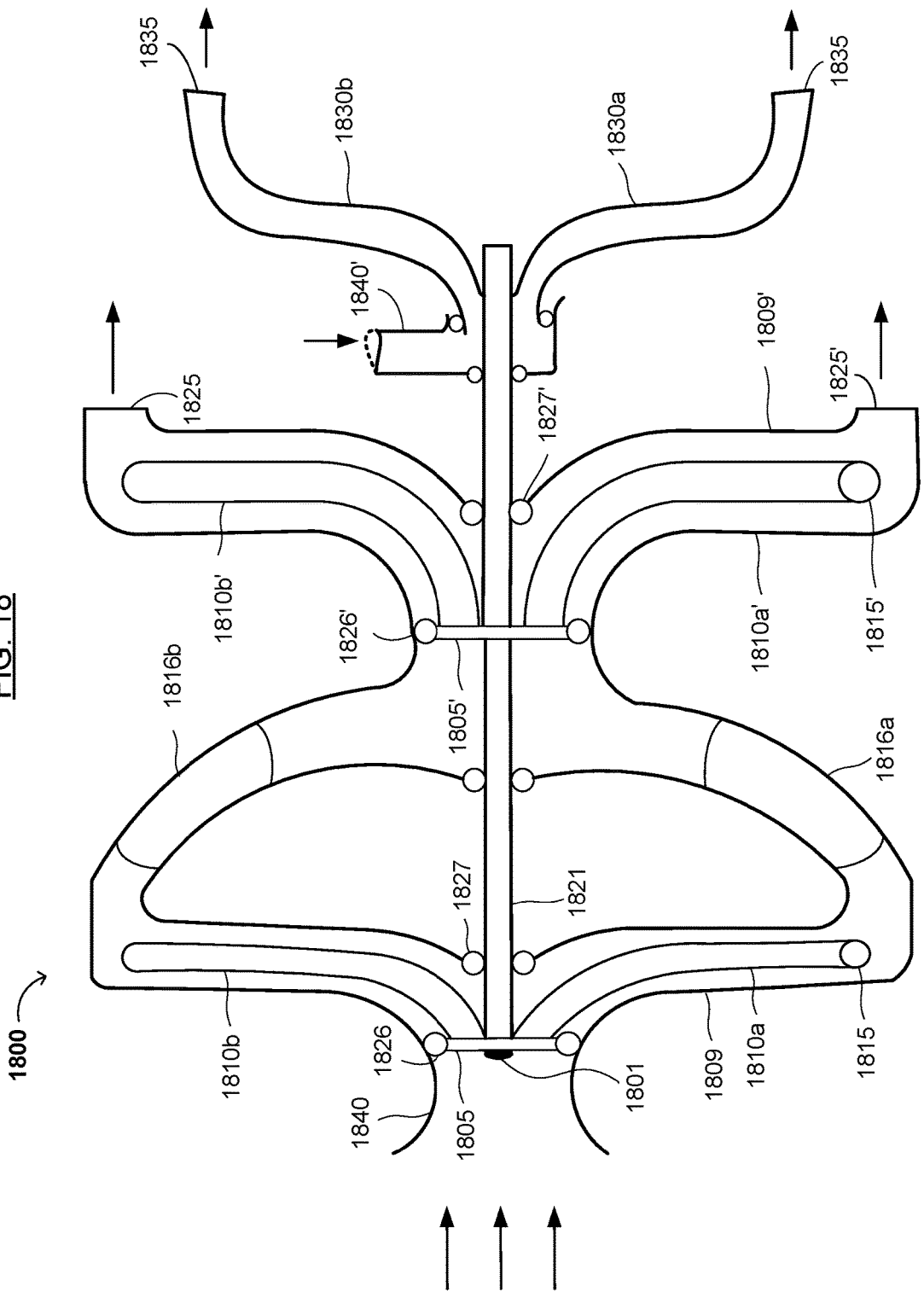
FIG. 18 is a cross-sectional view showing another exemplary rotary jet-based engine according to one or more embodiments of the present invention.

FIG. 18 is a cross-sectional view showing another exemplary rotary jet-based engine 1800 including the present rotary jet according to one or more embodiments of the present invention. Due to the light weight, design simplicity, and low resistance when rotating in the air, the present invention may be easily adopted for the aviation industry, producing efficient and inexpensive propulsion for aviation vehicles.

Similar to the rotary jets of FIGS. 1A-B, 3A-B, 8A-C and 9-16, the rotary jet in the engine 1800 generally comprises a central axle or shaft 1821 having a cap 1801, a first inlet 1805 configured to receive at least one fluid, a first plurality of radial arms 1810*a-b* extending radially from the central shaft or axle 1821, and first set of nozzles 1815 at a distal end of each rotating arm 1810*a-b*. The nozzle on the rotating arm 1810*b* is not shown because it faces away from the viewer. Although only two radial arms 1810*a-b* are shown, the rotary jet in FIG. 18 is not limited thereto (e.g., the rotary jet may haven radial arms, where n is an integer and 360/n is an integer or regular fraction).

The rotary jet 1800 may include a funnel or collector 1840 that is configured to receive fluid (e.g., air and/or fuel) and supply the fluid (e.g., air and/or fuel) to a first set of radial arms 1810*a-b* through a first inlet 1805. The first set of radial arms 1810*a-b* effectively compresses the air in the first housing 1809, which supplies the air to one or more combustion chamber(s) 1816. A fuel is supplied to the combustion chamber(s) 1816 for combustion or detonation therein. The fluid may include alternative fuels (e.g., ammonium nitrate powder, ammonia gas, hydrazine, etc.) as well as carbon-based materials such as propane, methane, natural gas, gasoline, diesel or jet fuel, cellulose powder, etc., may be used in the present device.

In exemplary embodiments, the funnel or collector 1840 is substantially the same as or similar to the funnel or collector 900 of FIG. 9, and connected in the same or a similar manner to the housing 1809, which is also similar to the housing 909 of FIG. 9. The housing 1809 curves from the nozzles 1815 to the second inlet 1805', and may include the combustion chamber(s) 1816.

Subsequently, the hot exhaust (e.g., combustion or detonation gases) and excess air from the combustion chamber(s) 1816 are supplied to a second set of radial arms 1810*a'*-*b'* through the second inlet 1805'. The hot exhaust/air mixture rotates the radial arms 1810*a'*-*b'* and the central axle or shaft 1821 attached or connected thereto, and is expelled through a second set of nozzles 1815' and one or more openings 1825*a'*-*b'* in a second housing 1809'. The second housing 1809' is substantially the same or similar to the second housing 1309' of FIG. 13.

The engine 1800 also includes a water-based propulsion device 1850 similar to that described with respect to FIG. 16. Water is provided through a conduit 1840' to an inlet/manifold 1860 of the device 1850. A housing (not shown) circumferentially surrounds the bearings 1828 and the inlet/manifold 1860 to ensure water-tight transfer of water from the conduit 1840' to the third set of radial arms 1830*a-b*. Rotation of the central shaft 1821 rotates the radial arms 1830*a-b*, forcing the water through the radial arms 1830*a-b* and pulling additional water into the manifold 1860. The water is subsequently expelled out of the nozzles 1835, optionally after vaporizing and/or ionizing the water, advantageously increasing the net thrust of the engine 1800.

Typically, in steam engines, combustion engines, and jet propulsion engines, temperature and pressure play a pivotal role. In order to increase temperature, combustion in turn is a critical component. However, in cold jet propulsion (as in various embodiments of the present invention without an internal combustion chamber), the speed of the thrust can easily achieve sonic speed using water (the density of which is 3 orders of magnitude larger than gasses). Therefore, the present invention does not require combustion to achieve thrust, thereby advantageously eliminating at least one cause of global warming.

The present invention is relatively simple and inexpensive to manufacture. In addition, high precision components may not be necessary when manufacturing the present invention. The present rotary jet advantageously provides simpler design and manufacturing of many modern energy generation devices/systems, machine tools and engines. The present rotary jet advantageously provides new products with lighter and more efficient devices or systems based on fluid chain reactions. Additional products may be developed based on the present rotary jet and fluid chain reaction. Furthermore, the present invention advantageously results in relatively high efficiency and/or improved performance of various energy converter systems and fluid transporters. The present rotary jet is environmentally friendly, and adaptable for use in the power generation industry, fluid transportation, vehicles, etc.

Exemplary Methods of Converting Energy and Transporting a Fluid

An exemplary method of converting energy according to one or more embodiments of the present invention generally includes receiving a flowing fluid in an inlet, rotating a plurality of radial arms through which the flowing fluid passes, expelling the fluid through a nozzle at a distal end of each radial arm, and converting the rotational thrust and/or force into mechanical work or electrical energy. The inlet is rotatable around a central shaft or axle. The plurality of arms radial receives the flowing fluid from the inlet, and rotate when the fluid enters the inlet and/or when a rotational force is applied to the central axle or shaft. Each nozzle has an opening facing away from a direction of rotation of the radial arms, thereby generating a rotational thrust and/or force on the central axle or shaft when the radial arms rotate.

In exemplary embodiments, a fluid (e.g., liquid or gas such as steam, air, water, mixtures thereof, etc.) is received at the inlet. Wind, water from a reservoir (e.g., behind a dam), gas from a combustion chamber, or steam from a boiler are energized with potential energy, heat and/or kinetic energy. During the method of converting energy, the fluid goes through the inlet, passes through the radial arms (picking up additional kinetic energy from the centrifugal force of the rotating arms), and is expelled or thrust out the nozzles, acting as a propulsion force for the radial arms and/or rotary jet containing the radial arms. In various embodiments, the direction of the nozzles is perpendicular to an imaginary line connecting the nozzles to the central axle or shaft. Alternatively, the direction of the nozzles is parallel to the central axle or shaft.

According to Newton's second and third Laws of Motion, as the reaction force acts or is applied to the rotating radial arms, the rotation speed of the central axle or shaft and/or radial arms increases. Thus, the centrifugal force increases as a result of an increase in the rotation speed. The fluid in the rotating radial arms rushes outward even faster due to higher centrifugal force. As the thrust increases, the rotation speed of the central axle or shaft and/or the radial arms may increase. As a result, a chain reaction of forces enables the rotation of the radial arms to achieve higher rotational speeds without the burden of excess input energy (e.g., from combustion of fuel). This chain reaction is controllable. Therefore, this fluid flow chain reaction, with a "self-amplifying" rotation speed, provides smart solutions for efficient generation of electrical energy or conversion of electrical or mechanical energy.

An exemplary method of transporting a fluid according to one or more embodiments of the present invention generally includes applying a rotational force to a central axle or shaft, drawing the fluid through an inlet into a plurality of radial arms that rotate radially around the central axle or shaft, and expelling the fluid through a nozzle at a distal end of each radial arm. The plurality of radial arms receive the fluid from the inlet, and are configured to rotate when the rotational force is applied to the central axle or shaft. Each nozzle may have an opening facing away from a direction of rotation of the radial arms. Alternatively, the nozzles may expel the fluid in a direction parallel to the central axle or shaft.

When the central axle or shaft is driven by a motor, the fluid will flow from the inlet, through the radial arms, and be expelled through the nozzles, enabling the present device to transport fluid to a different location or environment. When the motor operates at a relatively high speed, the centrifugal force becomes relatively high, increasing the thrust from the expelled fluid. When the nozzles face away from the direction of rotation of the radial arms, the propulsion force assists the rotation and increases the rotation speed or rate. As a result, the efficiency of transporting the fluid increases, and advantageously takes less energy to transport the fluid than conventional mechanisms (e.g., not using such a chain reaction).

CONCLUSION/SUMMARY

The present invention provides rotary jet and engine that can advantageously be integrated into conventional power generation systems and/or fluid transporters without special design changes or excessive costs. Additionally, the present rotary jet and engine can be manufactured using materials and parts similar to those used in conventional engines, and thus the cost of manufacturing may be substantially the same as (or less than) that of conventional engines. Furthermore, the present rotary jet and engine may more efficient and have less wear-and-tear than conventional combustion engines.

In addition, the present rotary jet and engine is advantageously simpler and easier to manufacture and repair than conventional rocket engines, as the payload can be absent, the fuel and oxidizer tanks can be located outside the housing that includes the combustion chamber (which may also improve the safety of the present invention), and the efficiency can be greatly improved. For example, with less weight in the housing containing the combustion/detonation chamber, frictional forces can be reduced, and the atmosphere inside the engine can be made less dense, further reducing rotational resistance in the present engine. As a result, the present engine and method(s) can contribute a relatively high proportion of the thrust towards rotational torque.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. A rotary device, comprising:
   a) a central axle or shaft;
   b) an inlet having the central axle or shaft therein, the inlet configured to receive at least a fluid;
   c) a manifold connected to the inlet, the manifold having the central axle or shaft therein and extending therefrom; and
   d) a plurality of radial arms in fluid communication with the inlet, each radial arm having a nozzle at a distal end thereof and an arc between said inlet and said nozzle, said radial arms extending radially from the manifold, wherein:
      at least one of the inlet, the manifold and the plurality of radial arms are joined, fastened or secured to the central axle or shaft,
      the inlet, the manifold and the plurality of radial arms are configured to rotate around the central axle or shaft when (i) said at least said fluid enters said inlet, passes through the manifold and radial arms, and is expelled out of said nozzles and/or (ii) when a rotational force is applied to said central axle or shaft, and the inlet, the manifold and said plurality of radial arms having a substantially continuous and hollow space therein from an opening of the inlet to an end of each of the nozzles.

2. The device of claim 1, wherein said at least one fluid comprises air, steam, water, combustion or detonation gases, chemical reaction gases, a coolant, or a refrigerant.

3. The device of claim 1, further comprising at least one aerodynamic surface on said radial arms, configured to reduce air resistance of said radial arms.

4. The device of claim 1, wherein said inlet comprises a plurality of openings,
   wherein each of said plurality of openings is connected to a corresponding and/or unique radial arm, and said inlet is configured to rotate radially around the central axle or shaft along with said radial arms.

5. The device of claim 1, further comprising a void or opening between the central axle or shaft and the inlet.

6. The device of claim 1, wherein each of said radial arms comprises a curved tubular arm.

7. The device of claim 1, wherein said radial arms are equally spaced from each other by 360°/n, where n equals a number of said radial arms.

8. The device of claim 1, wherein a flow of said fluid through said nozzle is at an angle perpendicular or substantially perpendicular to (i) said central axle or shaft and/or (ii) an angle of said fluid as said fluid enters said radial arms from said inlet.

9. The device of claim 8, wherein each said nozzle has an opening facing away from a direction of rotation of said radial arms, the device further comprises a mechanical work unit, and said mechanical work unit comprises a generator or an engine configured to receive said rotational energy or force from said central axle or shaft.

10. The device of claim 1, wherein said plurality of radial arms have a flared conical shape.

11. The device of claim 1, further comprising a mechanical work unit configured to (i) receive rotational energy or force from said central axle or shaft or (ii) apply a rotational force to said central axle or shaft.

12. A hydraulic, gas or wind energy generator, comprising the device of claim 11.

13. The device of claim 11, wherein said mechanical work unit comprises a motor configured to apply said rotational force to said central axle or shaft or provide or generate the rotational force applied to the central axle or shaft, and each said nozzle optionally has an opening facing in a direction parallel with said central axle or shaft.

14. The device of claim 13, wherein the device comprises an energy converter or a fluid transporter.

15. A pump, an air compressor, a vacuum cleaner, a water pump, a turbocharger, an engine, or a waterjet propulsion vehicle comprising the device of claim 11.

16. The device of claim 1, wherein said central axle or shaft extends through a lower or rear-facing surface of said manifold.

17. A method of converting energy using a rotary device, comprising:
   a) receiving a flowing fluid in an inlet of the rotary device, said inlet having a central axle or shaft therein and being in fluid communication with a plurality of radial arms of the rotary device;
   b) receiving said fluid in a manifold connected to the inlet, the manifold having the central axle or shaft therein and extending therefrom;
   c) distributing said fluid from said manifold to the plurality of radial arms, each of said plurality of radial arms having a nozzle at a distal end thereof, and each said nozzle having an opening facing away from a direction of rotation of said radial arms, wherein at least one of the inlet, the manifold and the plurality of radial arms are joined, fastened or secured to the central axle or shaft;
   d) expelling said fluid through said nozzles to rotate said inlet, the manifold and the plurality of radial arms around said central axle or shaft, said radial arms applying a rotational force to said central axle or shaft, wherein the inlet, the manifold and the plurality of radial arms have a substantially continuous and hollow space therein from an opening of the inlet to an end of each of the nozzles; and
   e) converting said rotational force into mechanical work or electrical energy.

18. The method of claim 17, wherein said fluid is expelled through said nozzle is at an angle perpendicular or substantially perpendicular to (i) said central axle or shaft, and/or (ii) an angle of said fluid as said fluid enters said radial arms from said inlet.

19. The method of claim 17, further comprising reacting, heating or combusting one or more substances to form at least part of said flowing fluid.

20. The method of claim 17, wherein said flowing fluid comprises air, steam, water, combustion or detonation gases, chemical reaction gases, a coolant, or a refrigerant.

21. A method of transporting a fluid using a rotary device, comprising:
   a) applying rotational force to a central axle or shaft of the rotary device, said central axle or shaft being operatively connected to a plurality of radial arms that are in fluid communication with and extend radially from a manifold having said central axle or shaft therein and extending therefrom, the manifold being in fluid communication with an inlet having said central axle or shaft therein, wherein at least one of the inlet, the manifold and the plurality of radial arms are joined, fastened or secured to the central axle or shaft, and the inlet, the manifold and the plurality of radial arms have a substantially continuous and hollow space therein from an opening of the inlet to an end of each of the nozzles;

b) drawing said fluid into the inlet, said plurality of radial arms being configured to receive said flowing fluid from said manifold when said rotational force is applied to said central axle or shaft; and c) expelling said fluid through a nozzle at a distal end of each arm to rotate said inlet, said manifold and said plurality of radial arms around said central axle or shaft.

22. A method of propelling a vehicle comprising the method of claim 21, wherein said fluid comprises air or water, a motor in said vehicle applies said rotational force to said central shaft or axle, and said inlet is (i) immersed in said water or (ii) facing a propulsion direction of said vehicle.

\* \* \* \* \*